(12) United States Patent
Kong

(10) Patent No.: US 12,120,377 B2
(45) Date of Patent: Oct. 15, 2024

(54) VIDEO PLAYING METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Fanyang Kong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 445 days.

(21) Appl. No.: 17/174,133

(22) Filed: Feb. 11, 2021

(65) Prior Publication Data

US 2021/0185386 A1    Jun. 17, 2021

Related U.S. Application Data

(63) Continuation of application No. PCT/CN2020/120266, filed on Oct. 12, 2020.

(30) Foreign Application Priority Data

Dec. 17, 2019   (CN) .......................... 201911300557.6

(51) Int. Cl.
*H04N 7/173*        (2011.01)
*H04N 21/431*       (2011.01)
(Continued)

(52) U.S. Cl.
CPC ..... *H04N 21/4316* (2013.01); *H04N 21/4394* (2013.01); *H04N 21/44213* (2013.01); *H04N 21/4788* (2013.01); *H04N 21/8456* (2013.01)

(58) Field of Classification Search
CPC .......... H04N 21/4316; H04N 21/4394; H04N 21/44213; H04N 21/4788; H04N 21/8456;
(Continued)

(56) References Cited

U.S. PATENT DOCUMENTS 10,701,434 B1 *  6/2020  Jindal .............. H04N 21/23418
2009/0175355 A1  7/2009  Gordon et al.
(Continued)

FOREIGN PATENT DOCUMENTS

CN         104994425 A    10/2015
CN         105847718 A     8/2016
(Continued)

OTHER PUBLICATIONS

The World Intellectual Property Organization (WIPO) International Search Report for PCT/CN2020/120266 Dec. 30, 2020 7 Pages (including translation).
(Continued)

*Primary Examiner* — Annan Q Shang
(74) *Attorney, Agent, or Firm* — ANOVA LAW GROUP, PLLC

(57) ABSTRACT

A video playing method and apparatus, an electronic device, and a storage medium are provided. The method includes: playing a target video; and according to a playing progress of the target video and starting position information and ending position information about a bullet comment adjustment video segment in the target video, a bullet comment display effect corresponding to the bullet comment adjustment video segment, to adjust a blocking degree of bullet comments blocking the bullet comment adjustment video segment in a display region of the target video when the target video is played to the bullet comment adjustment video segment.

18 Claims, 20 Drawing Sheets

(51) Int. Cl.
  *H04N 21/439* (2011.01)
  *H04N 21/442* (2011.01)
  *H04N 21/4788* (2011.01)
  *H04N 21/845* (2011.01)

(58) Field of Classification Search
  CPC ........... H04N 21/4312; H04N 21/4318; H04N 21/4882; H04N 21/44222
  See application file for complete search history.

(56) References Cited

U.S. PATENT DOCUMENTS

| | | | |
|---|---|---|---|
| 2013/0031582 A1* | 1/2013 | Tinsman | H04N 21/4316 |
| | | | 725/36 |
| 2016/0247328 A1* | 8/2016 | Han | H04N 21/8549 |
| 2017/0041674 A1* | 2/2017 | Roberts | H04N 21/4788 |
| 2018/0041783 A1* | 2/2018 | Xu | G10L 15/22 |
| 2018/0152767 A1 | 5/2018 | Liu et al. | |
| 2018/0160180 A1* | 6/2018 | Kedenburg, III | H04N 21/4753 |
| 2018/0352301 A1* | 12/2018 | Tofighbakhsh | H04N 21/2668 |
| 2020/0366965 A1* | 11/2020 | Gao | H04N 21/4312 |
| 2021/0019369 A1* | 1/2021 | Sharma | G06F 40/263 |

FOREIGN PATENT DOCUMENTS

| | | |
|---|---|---|
| CN | 107396194 A | 11/2017 |
| CN | 107484025 A | 12/2017 |
| CN | 107872714 A | 4/2018 |
| CN | 108124185 A | 6/2018 |
| CN | 108156528 A | 6/2018 |
| CN | 108391154 A | 8/2018 |
| CN | 109089170 A | 12/2018 |
| CN | 110958493 A | 4/2020 |

OTHER PUBLICATIONS

The State Intellectual Property Office of the People's Republic of China (SIPO) Office Action 1 for 201911300557.6 Oct. 10, 2020 9 Pages (including translation).

* cited by examiner

VIDEO PLAYING METHOD AND APPARATUS, ELECTRONIC DEVICE, AND STORAGE MEDIUM

CROSS-REFERENCES TO RELATED APPLICATIONS

This application is a continuation application of PCT Patent Application No. PCT/CN2020/120266, filed on Oct. 12, 2020, which claims priority to Chinese Patent Application No. 201911300557.6, filed with the China National Intellectual Property Administration on Dec. 17, 2019, and entitled "BULLET COMMENT ADJUSTMENT METHOD AND APPARATUS, ELECTRONIC DEVICE, AND STORAGE MEDIUM." Each of the above applications is incorporated herein by reference in its entirety.

FIELD OF THE TECHNOLOGY

The present disclosure relates to the field of the information technology (IT), and specifically to a video playing method and apparatus, an electronic device, and a storage medium.

BACKGROUND OF THE DISCLOSURE

With the development of the IT, especially the rapid development of the Internet, people disseminate information more flexibly and diversely. As a brand-new information dissemination form and media culture, bullet comments have changed the form of comments made by users of conventional video websites, and are more interactive.

With the continuous development of bullet comment technologies, the bullet comment technologies are increasingly widely applied to video websites. At the same time, an increasing number of users are also using functions of bullet comments to share their own comments with other users.

SUMMARY

Embodiments of the present disclosure provide a video playing method and apparatus, an electronic device, and a storage medium, to control a bullet comment display effect when a video is displayed.

The embodiments of the present disclosure provide a video playing method, performed by a terminal device. The method includes: playing a target video; and according to a playing progress of the target video and starting position information and ending position information about a bullet comment adjustment video segment in the target video, a bullet comment display effect corresponding to the bullet comment adjustment video segment, to adjust a blocking degree of bullet comments blocking the bullet comment adjustment video segment in a display region of the target video when the target video is played to the bullet comment adjustment video segment.

Correspondingly, the embodiments of the present disclosure provide a video playing apparatus. The apparatus includes: a playing unit, configured to play a target video; and a control unit, configured to control, according to a playing progress of the target video, and starting position information and ending position information about a bullet comment adjustment video segment in the target video, a bullet comment display effect corresponding to the bullet comment adjustment video segment, to adjust a blocking degree of bullet comments blocking the bullet comment adjustment video segment in a display region of the target video when the target video is played to the bullet comment adjustment video segment The embodiments of the present disclosure provide an electronic device. The electronic device includes a memory and a processor, the memory storing a plurality of instructions. The processor loads the instructions to perform: playing a target video; and according to a playing progress of the target video and starting position information and ending position information about a bullet comment adjustment video segment in the target video, a bullet comment display effect corresponding to the bullet comment adjustment video segment, to adjust a blocking degree of bullet comments blocking the bullet comment adjustment video segment in a display region of the target video when the target video is played to the bullet comment adjustment video segment.

In addition, the embodiments of the present disclosure further provide a non-transitory storage medium, storing a computer program, the computer program, when run by a processor, performing: playing a target video; and according to a playing progress of the target video and starting position information and ending position information about a bullet comment adjustment video segment in the target video, a bullet comment display effect corresponding to the bullet comment adjustment video segment, to adjust a blocking degree of bullet comments blocking the bullet comment adjustment video segment in a display region of the target video when the target video is played to the bullet comment adjustment video segment.

BRIEF DESCRIPTION OF THE DRAWINGS

To describe the technical solutions in embodiments of the present disclosure more clearly, the following briefly describes accompanying drawings required for describing the embodiments. Apparently, the accompanying drawings in the following description show merely some embodiments of the present disclosure, and a person skilled in the art may still derive other drawings from these accompanying drawings without creative efforts.

DESCRIPTION OF EMBODIMENTS

The technical solutions in embodiments of the present disclosure are clearly described in the following with reference to the accompanying drawings in the embodiments of the present disclosure. Apparently, the described embodiments are merely some embodiments of the present disclosure rather than all of the embodiments. All other embodiments obtained by a person skilled in the art based on the embodiments of the present disclosure without creative efforts shall fall within the protection scope of the present disclosure.

With the continuous development of bullet comment technologies, the bullet comment technologies are increasingly widely applied to video websites. At the same time, an increasing number of users are also using functions of bullet comments to share their own comments with other users. However, a user, when watching a video, is affected to some extent when there are too many bullet comments on a screen. Especially, a case that content of a video is completely blocked by bullet comments often occurs in a climax segment of the video.

The embodiments of the present disclosure provide a video playing method and apparatus, an electronic device, and a storage medium. A target video is played, and according to a playing progress of the target video, and starting position information and ending position information about a bullet comment adjustment video segment in the target video, a bullet comment display effect corresponding to the bullet comment adjustment video segment is controlled, to adjust a blocking degree of bullet comments blocking the bullet comment adjustment video segment in a display region of the target video when the target video is played to the bullet comment adjustment video segment. In the present disclosure, in a bullet comment adjustment video segment of a video, a bullet comment display effect corresponding to the bullet comment adjustment video segment may be controlled to make the effect better meet user watching requirements.

The embodiments of the present disclosure provide a video playing method and apparatus, an electronic device, and a storage medium. Specifically, the embodiments of the present disclosure provide a video playing apparatus applicable to an electronic device. The electronic device may be a device such as a terminal. The terminal may be a device such as a mobile phone, a tablet computer, or a notebook computer.

It may be understood that the video playing method in the embodiments of the present disclosure may be performed on a terminal, or may be performed by a terminal and a server together. The examples above are not to be construed as limitations on the present disclosure.

Figure 1:
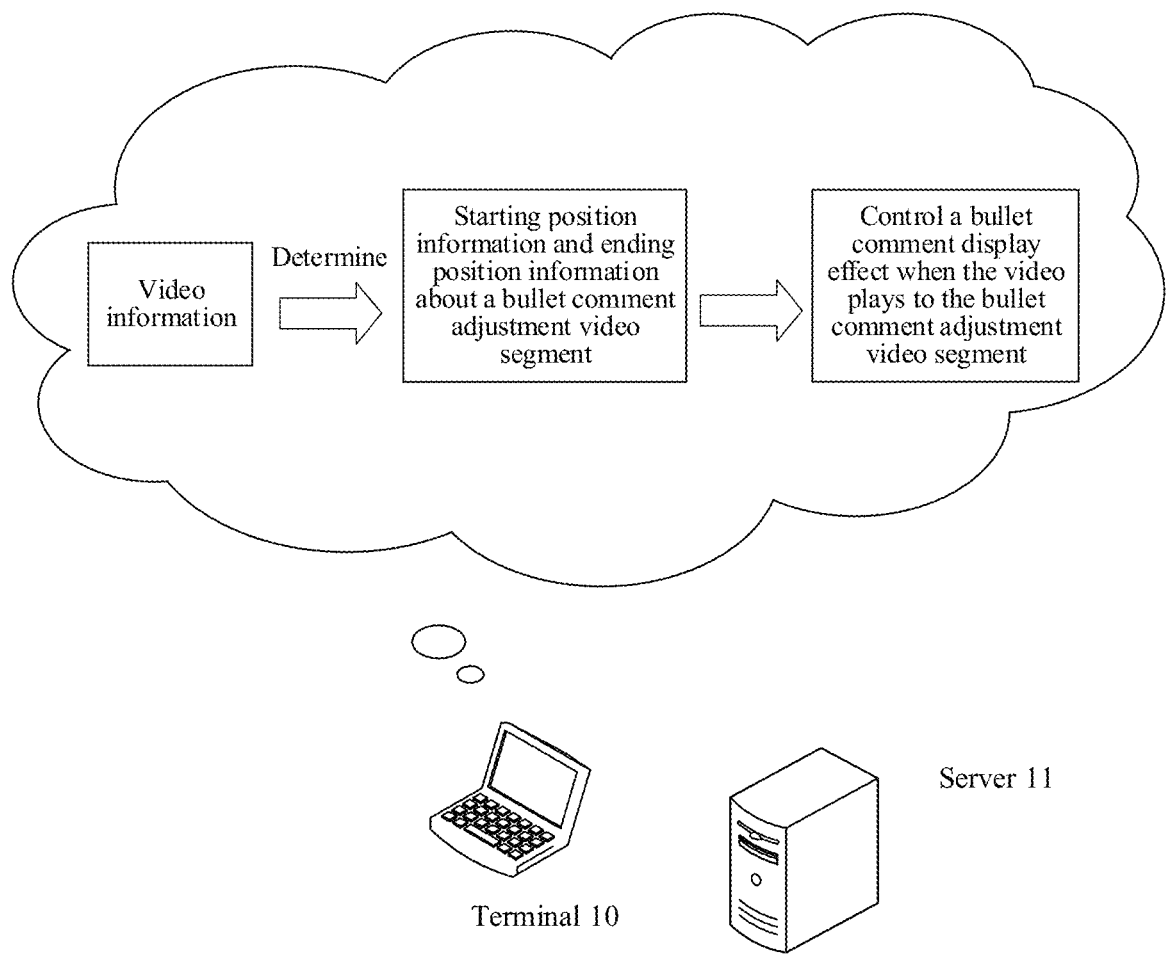
FIG. 1 is a schematic scenario diagram of a video playing method according to an embodiment of the present disclosure.

Referring to FIG. 1, for example, a video playing method is performed by a terminal and a server together. A video playing system provided in the embodiments of the present disclosure includes a terminal 10, a server 11 and the like. The terminal 10 is connected to the server 11 by using a network, for example, a wired or wireless network. A video playing apparatus is integrated in the terminal, for example, is integrated in the terminal 10 in the form of a client. The client may be a video client, a browser client or the like.

The terminal 10 may be configured to play a target video, and control, according to a playing progress of the target video, and starting position information and ending position information about a bullet comment adjustment video segment in the target video, a bullet comment display effect corresponding to the bullet comment adjustment video segment, to adjust a blocking degree of bullet comments blocking the bullet comment adjustment video segment in a display region of the target video when the target video is played to the bullet comment adjustment video segment. In addition, before the bullet comment display effect corresponding to the bullet comment adjustment video segment is controlled, the terminal 10 may be further configured to obtain video information about the target video; and determine, based on the video information, the bullet comment adjustment video segment in which bullet comments need to be adjusted in the target video.

The terminal 10 may transmit a request for obtaining the video information about the target video to the server 11, and then receive the video information about the target video transmitted by the server 11. The terminal 10 may include a mobile phone, a tablet computer, a notebook computer, a personal computer (PC), or the like.

The server 11 may be configured to obtain content attractiveness representation information about the target video, the content attractiveness representation information being used for representing attractiveness of content of the target video for a user; determine the starting position information and the ending position information about the bullet comment adjustment video segment in the target video based on the content attractiveness representation information; record, in the video information corresponding to the target video, the starting position information and the ending position information about the bullet comment adjustment video segment in the target video; and transmit, when receiving a request for playing the target video by the terminal 10, the video information corresponding to the target video to the terminal 10. The server 11 may be a single server, or a server cluster including a plurality of servers.

The operation "determining the starting position information and the ending position information about the bullet comment adjustment video segment in the target video based on the content attractiveness representation information" performed by the server 11 may alternatively be performed by the terminal 10.

In one embodiment, the starting position information and the ending position information about the bullet comment adjustment video segment in the target video may be pre-calculated by the server or another device, and then pre-stored in the terminal 10 or the server 11. The terminal 10, when displaying the target video, may obtain the starting position information and the ending position information about the bullet comment adjustment video segment in the target video locally or from the server, to determine the bullet comment adjustment video segment in the target video. Then, the bullet comment display effect corresponding to the bullet comment adjustment video segment is controlled when the target video is played to the bullet comment adjustment video segment. Alternatively, the starting position information and the ending position information about the bullet comment adjustment video segment in the target video may be obtained by a device such as the server or the terminal through real-time calculation.

The video playing method provided in the embodiments of the present disclosure relates to the network technique in the field of the IT. In the embodiments of the present disclosure, in a bullet comment adjustment video segment of a video, a bullet comment display effect corresponding to the bullet comment adjustment video segment may be controlled to make the effect better meet user watching requirements.

The IT is mainly to design, develop, install, and implement information systems and application software by applying the computer science and communication technologies. The IT is also generally referred to as an information and communications technology. The wide application of the IT enables important production factors and strategic resources of information to play a role, and enables people to optimize resource configuration more efficiently.

The network technique fuses resources scattered on the Internet into an organic whole, to realize comprehensive sharing of and organic collaboration between the resources, so that people can transparently use the whole capabilities of the resources and obtain information as required. The resources include high-performance computers, storage resources, data resources, information resources, knowledge resources, expert resources, large databases, networks, sensors and the like.

Detailed descriptions are separately provided below. The description order of the following embodiments is not intended to limit a preference order of the embodiments.

One embodiment of the present disclosure is described by using an example in which the video playing method is performed by a terminal, and specifically, is performed by a video playing apparatus integrated in a terminal.

The video playing method of one embodiment of the present disclosure may be applied to various types of video players to control a bullet comment display effect of a bullet comment adjustment video segment of a video. The video player may be a third-party application program or the like. It may be understood that the video playing method may be further applied to a case that a video is played on a web page.

Figure 2:
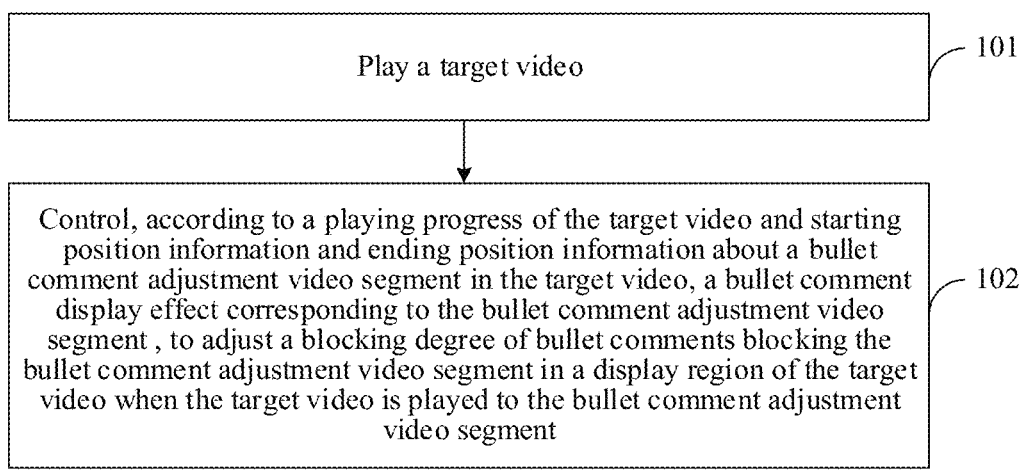
FIG. 2 is a flowchart of a video playing method according to an embodiment of the present disclosure.

As shown in FIG. 2, a specific process of the video playing method may be as follows:

101: Play a target video.

The target video may be various types of on-demand videos, such as news videos, history videos, or variety videos, and the like. In addition, the target video may be alternatively a live video.

In one embodiment, neither a video type nor a video duration of the target video is limited. The target video may be played on a video client, a browser client, or the like.

102: Control, according to a playing progress of the target video, and starting position information and ending position information about a bullet comment adjustment video segment in the target video, a bullet comment display effect corresponding to the bullet comment adjustment video segment, to adjust a blocking degree of bullet comments blocking the bullet comment adjustment video segment in a display region of the target video when the target video is played to the bullet comment adjustment video segment.

The bullet comment adjustment video segment is a video segment in which a blocking degree of bullet comments blocking the target video are going to be adjusted.

Figure 3A:
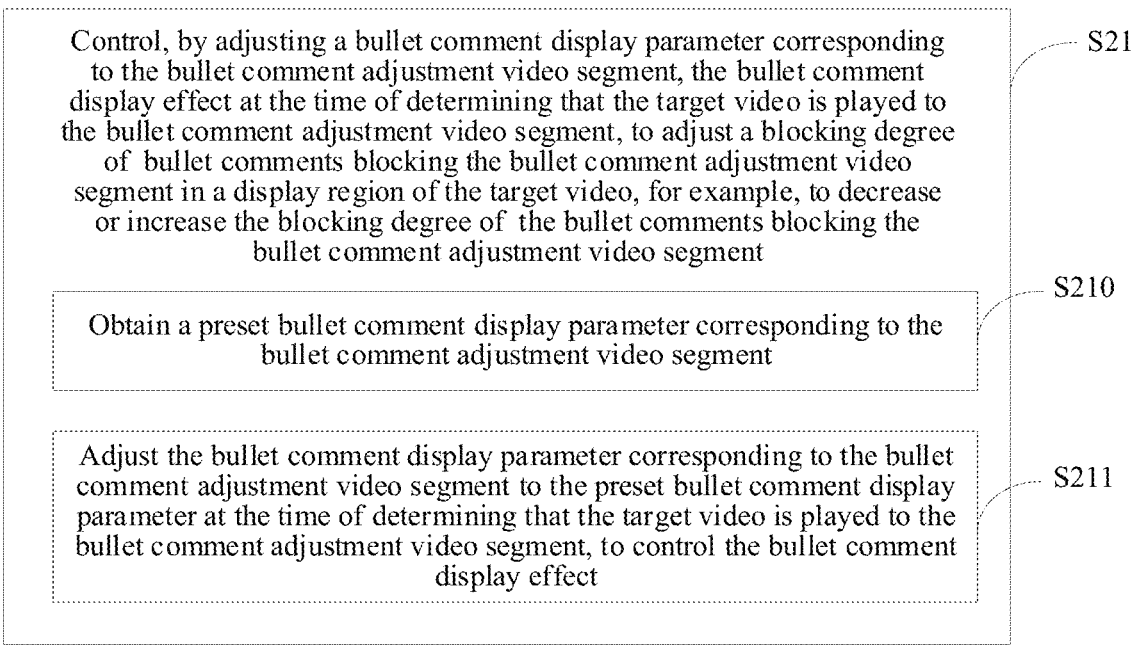
FIG. 3A to FIG. 3J are flowcharts of exemplary video playing processes according to some embodiments of the present disclosure.

In one embodiment, as shown in FIG. 3A, step 102 may include the following step:

S21: Control, by adjusting a bullet comment display parameter corresponding to the bullet comment adjustment video segment, the bullet comment display effect at the time of determining that the target video is played to the bullet comment adjustment video segment, to adjust a blocking degree of bullet comments blocking the bullet comment adjustment video segment in a display region of the target video, for example, to decrease or increase the blocking degree of the bullet comments blocking the bullet comment adjustment video segment.

The bullet comment display parameter may include at least one of the following parameters: a bullet comment display region, a bullet comment speed, a bullet comment font size, and bullet comment transparency.

In some embodiments, as shown in FIG. 3A, step S21 may include the following steps:

S210: Obtain a preset bullet comment display parameter corresponding to the bullet comment adjustment video segment.

S211: Adjust the bullet comment display parameter corresponding to the bullet comment adjustment video segment to the preset bullet comment display parameter when the target video is played to the bullet comment adjustment video segment, to control the bullet comment display effect.

The preset bullet comment display parameter may be recorded in the video information about the target video. Before step 102, the video information about the target video may be obtained. The video information includes the preset bullet comment display parameter corresponding to the bullet comment adjustment video segment, so that the preset bullet comment display parameter corresponding to the bullet comment adjustment video segment may be extracted from the video information.

The preset bullet comment display parameter may include at least one of the following parameters: a preset bullet comment display region, a preset bullet comment speed, a preset bullet comment font size, and preset bullet comment transparency. Each preset bullet comment display parameter may be set according to an actual requirement. For example, the preset bullet comment display parameter may be set according to a requirement of decreasing a blocking degree of blocking, by bullet comments, the target video to a certain threshold. This is not limited in herein.

For example, in the preset bullet comment display parameters, the preset bullet comment display region may be set to ¼ of the target video display screen, the preset bullet comment speed may be set to a relatively low preset speed, the preset bullet comment font size may be set to 50% of a standard font size, and the preset bullet comment transparency may be set to 50%.

In some embodiments, the preset bullet comment display region may be set to ¼ of a target video display screen. For example, in the bullet comment adjustment video segment of the target video, bullet comments may be displayed on ¼ of the target video display screen according to the preset bullet comment display region, and displayed on the top of the target video display screen.

In some embodiments, the preset bullet comment speed may be set to half of a standard bullet comment speed. For example, for the standard bullet comment speed, it needs to take a bullet comment 4 s from the beginning of being displayed on a display region of the target video to disappearing from the display region of the target video. For the preset bullet comment speed, it may take a bullet comment 8 s from the beginning of being displayed on a display region of the target video to disappearing from the display region of the target video. In this way, a density of bullet comments may be decreased, to decrease a blocking degree of blocking, by the bullet comments, video content of the bullet comment adjustment video segment.

In some embodiments, the preset bullet comment font size may alternatively be set to a font size smaller than the standard bullet comment font size by one grade. For example, if the standard bullet comment font size is the font size five, the preset bullet comment font size may be set to the font size six. In this way, a blocking degree of blocking video content of the target video may be decreased in the bullet comment adjustment video segment of the target video.

In some embodiments, the preset bullet comment transparency may alternatively be set to enable a user to not only watch a relatively large number of bullet comments, but also watch video content in a bullet comment adjustment video segment of a target video. For example, the preset bullet comment transparency may be set to 50%. In this way, the video content is not completely blocked, and a relatively large number of bullet comments may still be watched.

In some embodiments, the bullet comments in the bullet comment adjustment video segment of the target video may alternatively be completely hidden. That is, the bullet comments are not displayed. For example, the bullet comment transparency of the bullet comment adjustment video segment may be set to 100% to hide the bullet comments.

Figure 3B:
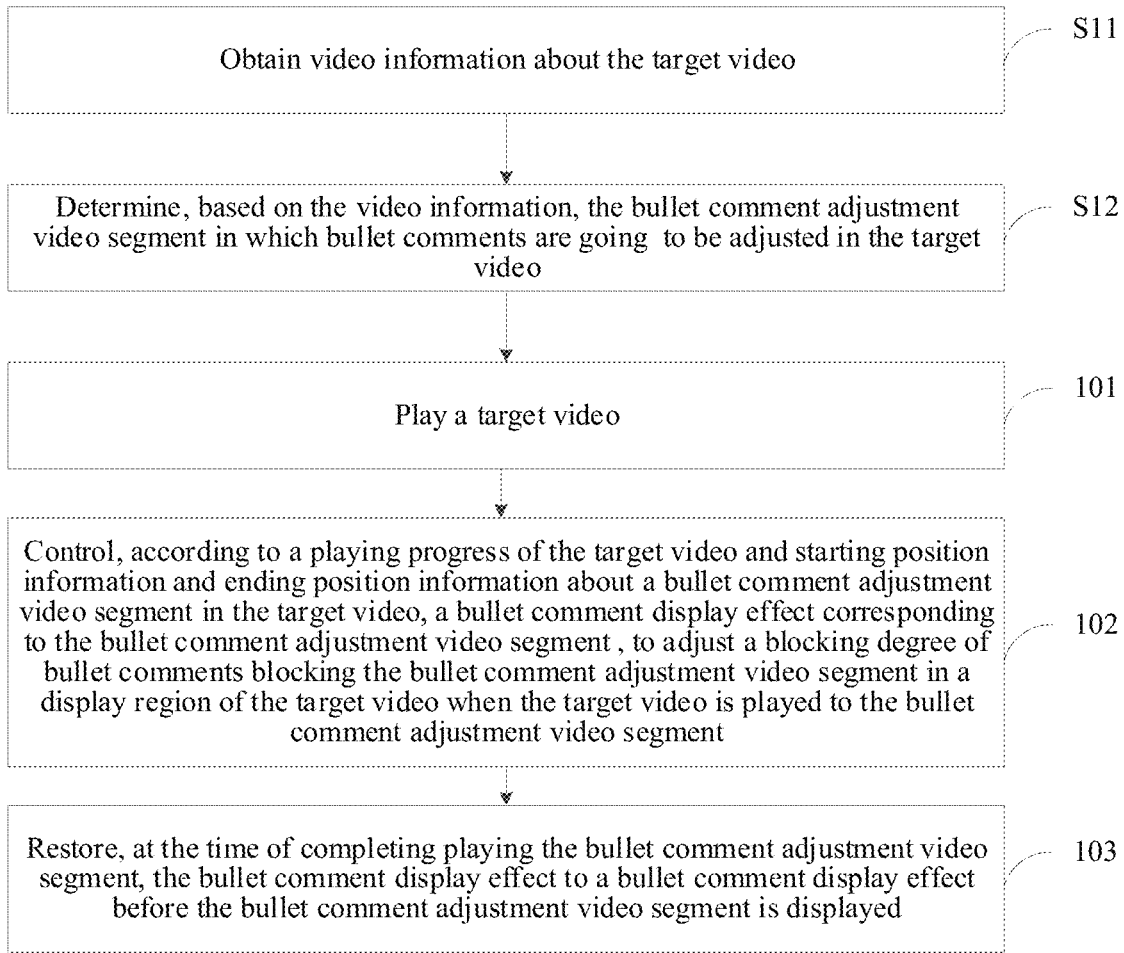

In some embodiments, as shown in FIG. 3B, after step 102, the method further includes the following step:

103: Restore, at the time of completing playing the bullet comment adjustment video segment, the bullet comment display effect to a bullet comment display effect before the bullet comment adjustment video segment is displayed.

Figure 4A:
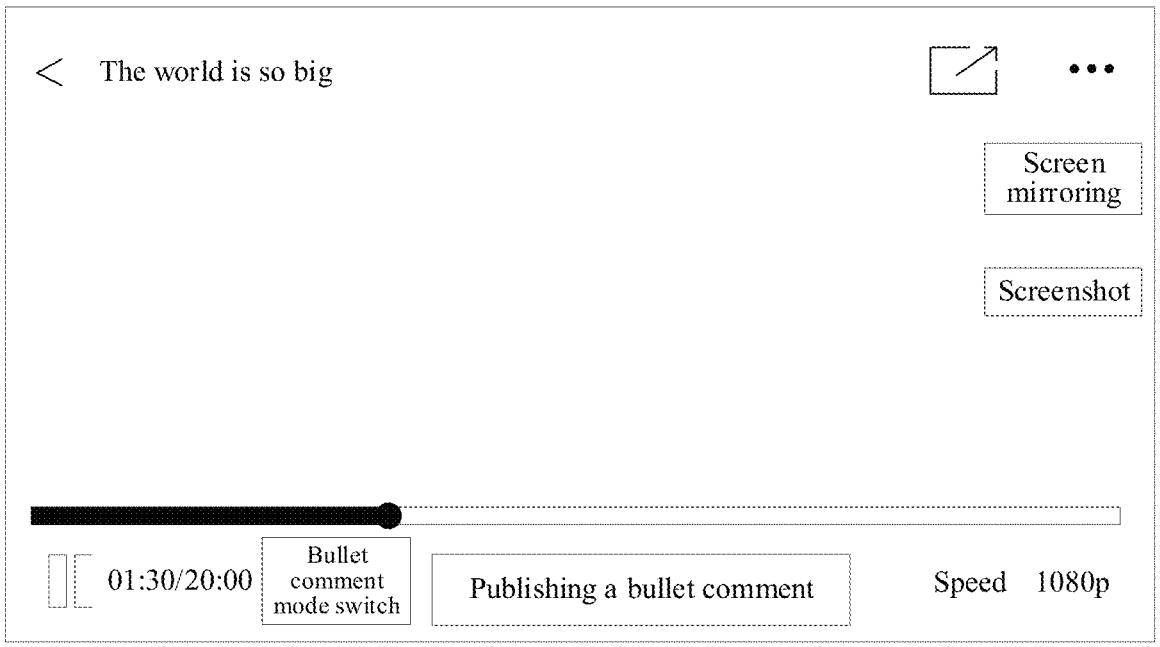
FIG. 4A is a schematic diagram of a user interface according to an embodiment of the present disclosure.

In a specific scenario, the bullet comment adjustment video segment may be a climax segment of the target video. Generally, in a climax segment, there are a relatively large number of bullet comments. A case that video content is completely blocked by the bullet comments even occurs. In a current technical solution, as shown in FIG. 4A, in a scenario in which a video is watched under a bullet comment mode, a user needs to turn off the bullet comment mode or needs to adjust a bullet comment display parameter when the video enters a climax segment, to reduce the impact of the bullet comments on watching video content. The user may need to turn on the bullet comment mode again or readjust the bullet comment display parameter after the climax segment is finished. In this way, in a process of playing the video, the user may turn on or turn off the bullet comment mode for a plurality of times, or adjust the bullet comment display parameter for a plurality of times. Consequently, this is inconvenient for the user to watch the video, and causes a certain impact on user experience.

Figure 4B:
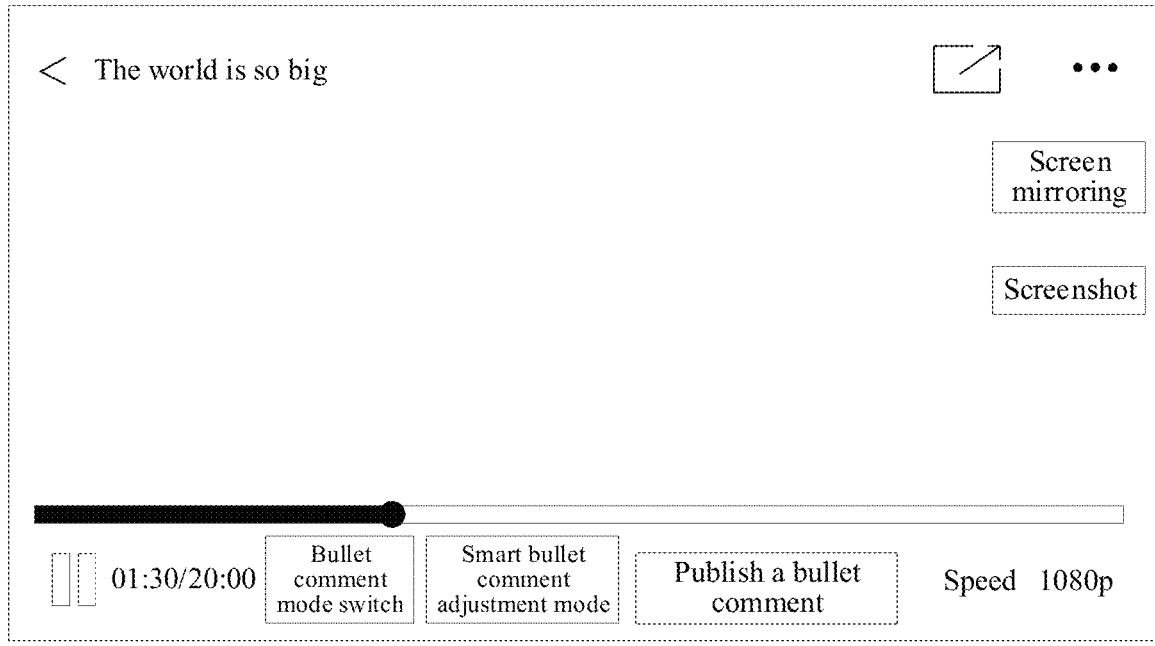
FIG. 4B is a schematic diagram of another user interface according to an embodiment of the present disclosure.
Figure 5:
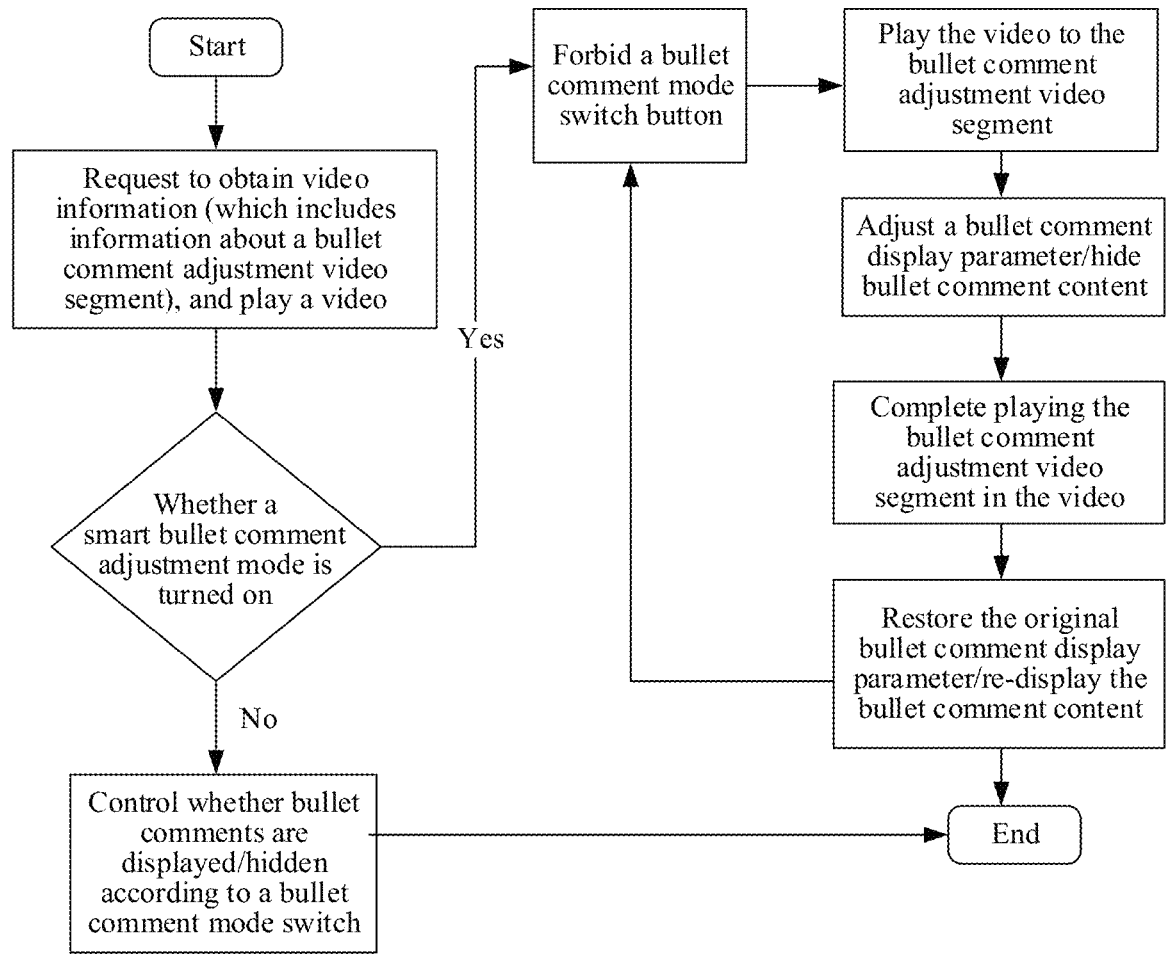
FIG. 5 is another flowchart of a video playing method according to an embodiment of the present disclosure.

In some embodiments of the present disclosure, the terminal, when requesting to play the target video, obtains the bullet comment adjustment video segment information about the target video. In a process of playing the video, if a smart bullet comment adjustment mode is not turned on, the target video is played in an original playing mode, to control the displaying and hiding of bullet comments by turning on and turning off the bullet comment mode. If the smart bullet comment adjustment mode is turned on, functions of turning on and turning off the bullet comment mode are forbidden, and then it is determined, according to the bullet comment adjustment video segment information about the target video, whether a current time of playing the target video enters a time period of the bullet comment adjustment video segment. If the current time of playing the target video enters the time period of the bullet comment adjustment video segment, the bullet comment display parameter is adjusted to adjust a blocking degree of bullet comments blocking the bullet comment adjustment video segment in a display region of the target video, thereby presenting a relatively clean video playing interface to a user. When playing the bullet comment adjustment video segment of the target video is completed, the bullet comment display parameter is restored to a bullet comment display parameter before the bullet comment adjustment video segment is played. If there are a plurality of bullet comment adjustment video segments in the target video, the bullet comment display parameter is adjusted in the foregoing manner. Referring to FIG. 4B and FIG. 5, when the user turns off the smart bullet comment adjustment mode, the functions of turning on and turning off the bullet comment mode are restored. Displaying and hiding the bullet comments are controlled according to states of turning on and turning off the bullet comment mode.

Figure 4C:
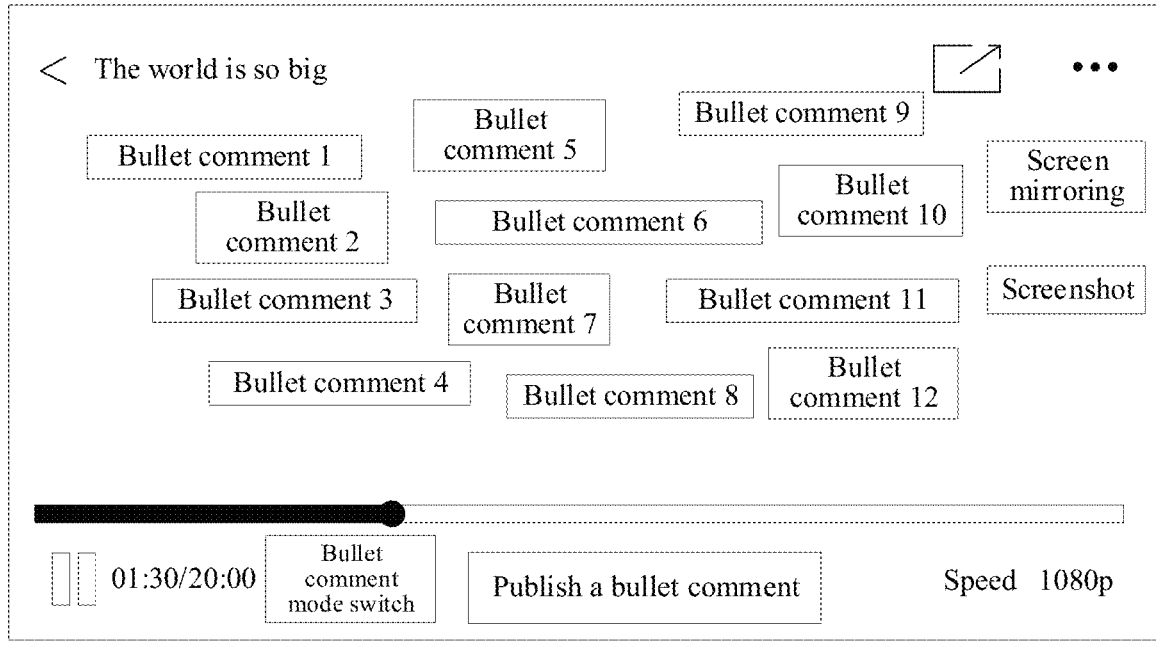
FIG. 4C is a schematic diagram of a bullet comment display effect according to an embodiment of the present disclosure.
Figure 4D:
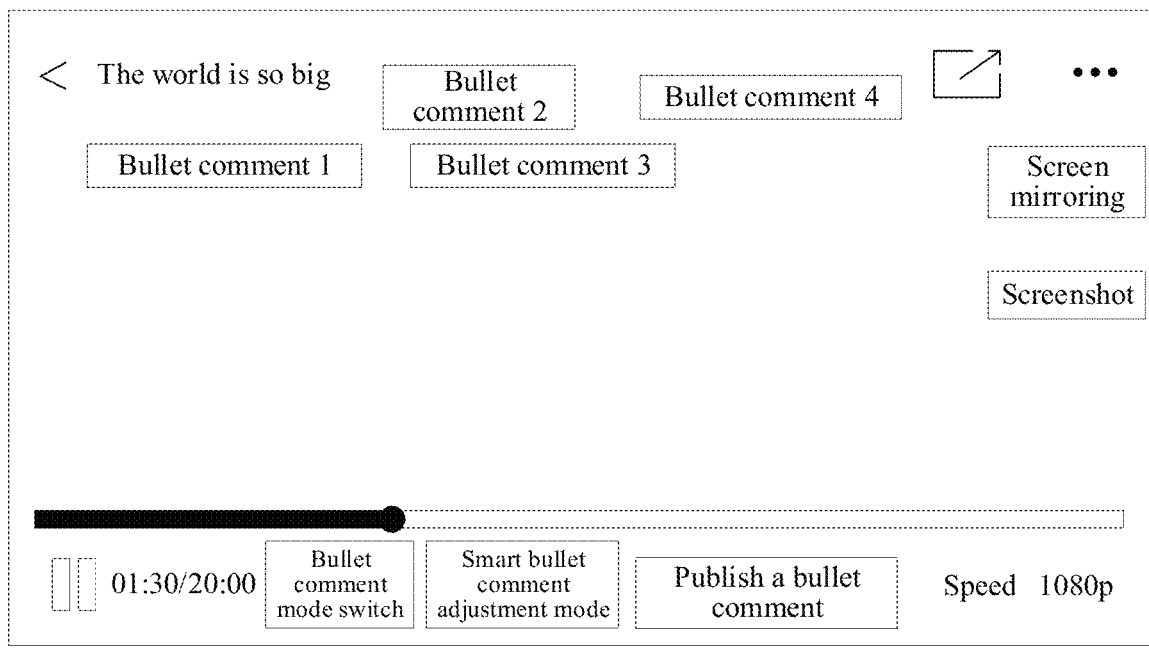
FIG. 4D is a schematic diagram of a bullet comment display effect of a bullet comment adjustment video segment after a smart bullet comment adjustment mode is enabled according to an embodiment of the present disclosure.

FIG. 4C and FIG. 4D respectively show a bullet comment display effect of the climax segment when the smart bullet comment adjustment mode is not turned on, and a bullet comment display effect of the climax segment when the smart bullet comment adjustment mode is turned on. Through a comparison, it may be learned that the smart bullet comment adjustment mode can decrease the blocking degree of the bullet comments blocking the bullet comment adjustment video segment in a display region of the target video.

In another scenario, the user has already watched the bullet comment adjustment video segment for a plurality of times, and intends to watch more bullet comments. This may also be implemented by using this solution to display more bullet comments.

Figure 3C:
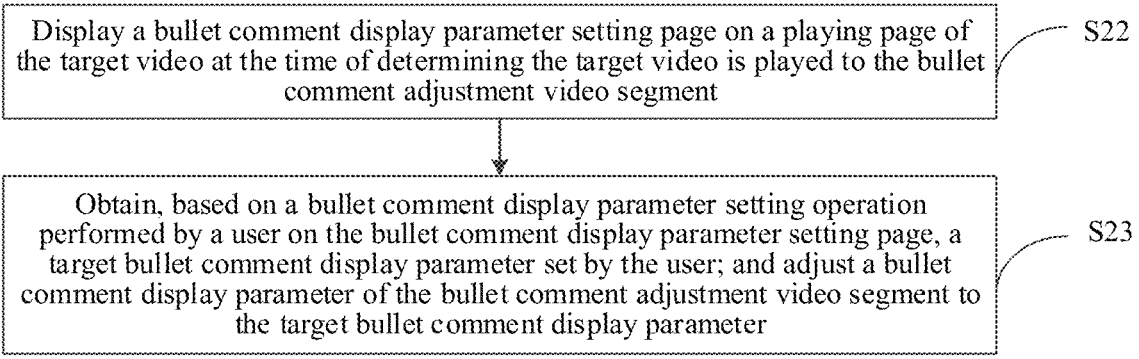

In some embodiments, the bullet comment display effect of the bullet comment adjustment video segment may be controlled based on user settings. As shown in FIG. 3C, step 102 may include the following steps:

S22: Display a bullet comment display parameter setting page on a playing page of the target video when the target video is played to the bullet comment adjustment video segment.

S23: Obtain, based on a bullet comment display parameter setting operation performed by a user on the bullet comment display parameter setting page, a target bullet comment display parameter set by the user; and adjust a bullet comment display parameter of the bullet comment adjustment video segment to the target bullet comment display parameter.

The bullet comment display parameter setting page may include at least one of the following types: a bullet comment speed setting sub-control, a bullet comment display region setting sub-control, a bullet comment font setting sub-control, and a bullet comment transparency setting sub-control. A corresponding bullet comment display parameter may be adjusted by setting the foregoing sub-control to obtain a corresponding bullet comment display effect.

The user may set a bullet comment display effect during a bullet comment adjustment video segment in the foregoing manner to meet a personal requirement of the user for bullet comments. If the user wants more bullet comments, the user may increase a bullet comment display region, shrink a bullet comment font size, increase a bullet comment speed, or the like through the bullet comment display parameter setting operation on the bullet comment display parameter setting page. If the user does not like too many bullet comments, the user may decrease the bullet comment display region, reduce the bullet comment speed, or the like.

In some embodiments, as shown in FIG. 3B, before step 102, the method further includes the following steps:

S11: Obtain video information about the target video.

S12: Determine, based on the video information, the bullet comment adjustment video segment in which bullet comments are going to be adjusted in the target video.

The video information about the target video is obtained in many manners.

For example, the video information about the target video may be obtained from a local database of a terminal. For example, if the video information about the target video may be stored in the local database of the terminal, the video information about the target video may be directly obtained from the local database when an instruction of obtaining the video information about the target video is received.

For example, the video information about the target video may alternatively be obtained by another device, and then provided to a video playing apparatus. That is, the video playing apparatus may receive the video information about the target video transmitted by the another device. For example, a terminal may transmit a request for obtaining the video information about the target video to a server. The server, after receiving the request, transmits the video information corresponding to the target video to the terminal, and the terminal may obtain the video information about the target video.

For example, specifically, the video information about the target video may be stored in a shared ledger of a blockchain. When the video information about the target video needs to be obtained, the video information about the target video is extracted from the shared ledger of the blockchain and provided to the video playing apparatus.

In other embodiments, the video information about the target video may alternatively be obtained by a server, and the bullet comment adjustment video segment of the target video is determined based on the video information.

The video information in one embodiment may include video content of the target video, user interaction information of the target video, and/or the like. The video content of the target video may include image information, audio information, and subtitle information about the target video. The user interaction information may include at least one of the following types: user comments, a user comment like quantity, bullet comment information, a playing situation of each video segment in the target video, and the like.

In some embodiments, a terminal may obtain the video content of the target video from a local database, and then request to obtain the user interaction information of the target video from a server to obtain the user interaction information of the target video.

In some embodiments, the video information may further include starting position information and ending position information, in the target video, about the bullet comment adjustment video segment of the target video.

S12 is implemented in a plurality of manners that are specifically as follows:

(1) The video information includes starting position information and ending position information, in the target video, about the bullet comment adjustment video segment of the target video.

In one embodiment, the starting position information and the ending position information about the bullet comment adjustment video segment may be pre-calculated and then stored in a database of a terminal or a server, and when needed, is extracted from the database. For example, the video information is pre-stored in the database of the server, is extracted from the database when a request, for obtaining the video information about the target video, that is transmitted by the terminal is received, and is transmitted to the terminal.

Figure 3D:
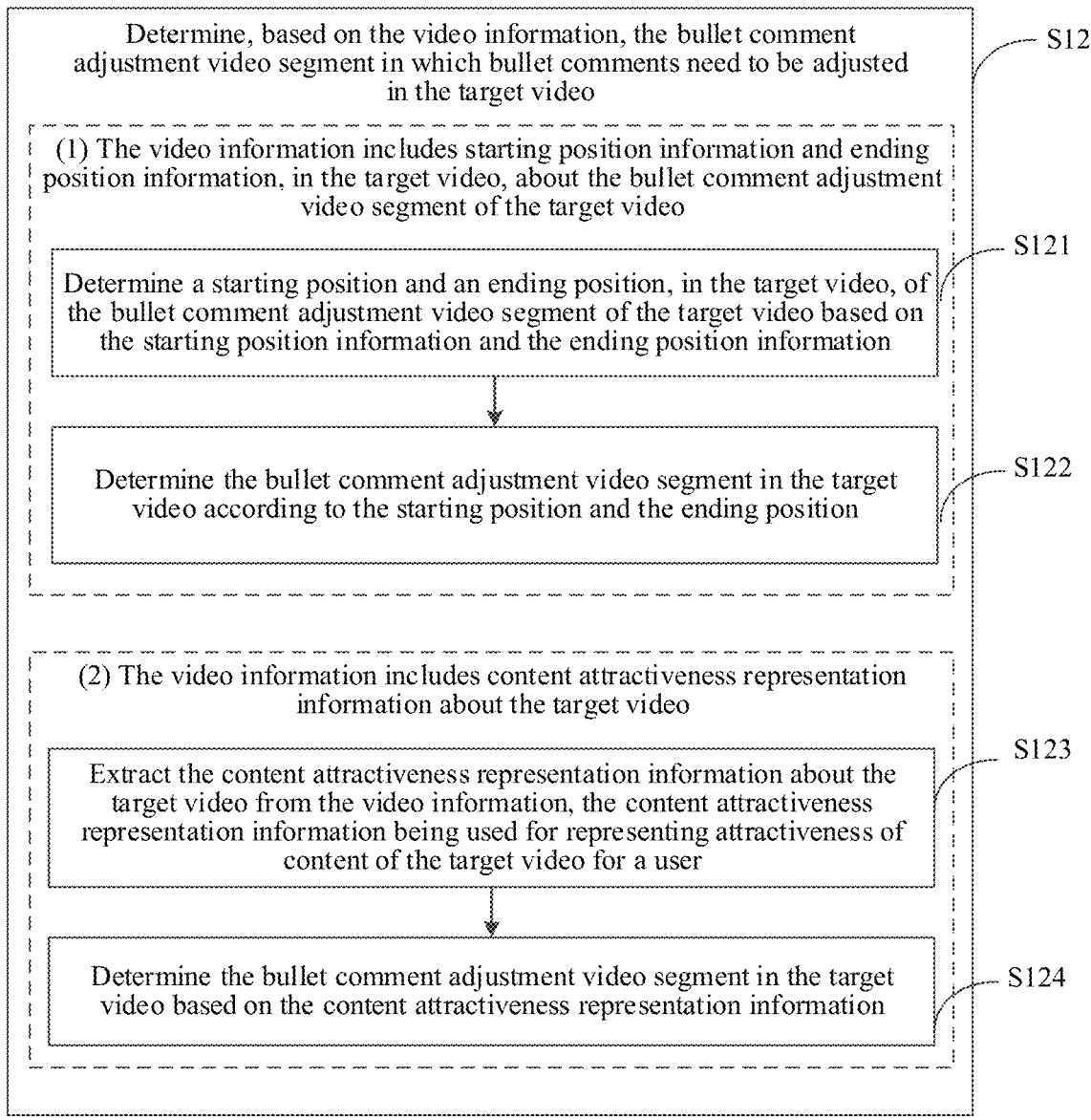

For example, in some embodiments, as shown in FIG. 3D, step S12 may include the following steps:

S121: Determine a starting position and an ending position, in the target video, of the bullet comment adjustment video segment of the target video based on the starting position information and the ending position information.

S122: Determine the bullet comment adjustment video segment in the target video according to the starting position and the ending position.

The bullet comment adjustment video segment may be a climax segment of the target video. The climax segment is a video segment having a relatively high user attention degree.

The starting position information and the ending position information may be specifically a starting time point and an ending time point, in the target video, of the bullet comment adjustment video segment of the target video, or may be percentages of a segment duration from a playing starting point of the target video to the starting position of the bullet comment adjustment video segment, and a segment duration from the playing starting point of the target video to the ending position of the bullet comment adjustment video segment, compared with a playing duration of the overall target video. For example, a time point at which 20% of the target video is located is used as the starting position of the bullet comment adjustment video segment, and a time point at which 25% of the target video is located is used as the ending position of the bullet comment adjustment video segment.

In one embodiment, step S12 may be specifically: the server determines the starting position information and the ending position information about the bullet comment adjustment video segment in the target video based on the video content of the target video and the user interaction information about the target video, and records, in the video information corresponding to the target video, the starting position information and the ending position information about the bullet comment adjustment video segment in the target video; and the video information is pre-stored in the database of the server, and server transmits the video information to the terminal when the terminal needs to obtain the starting position information and the ending position information about the bullet comment adjustment video segment in the target video; or may be: the terminal obtains the starting position information and the ending position information about the bullet comment adjustment video segment in the target video from the local database to determine the bullet comment adjustment video segment in the target video; or may be: the terminal or the server determines the bullet comment adjustment video segment of the target video through real-time calculation.

(2) The video information includes content attractiveness representation information about the target video.

In some embodiments, as shown in FIG. 3D, step S12 may include the following steps:

S123: Extract the content attractiveness representation information about the target video from the video information, the content attractiveness representation information being used for representing attractiveness of content of the target video for a user.

S124: Determine the bullet comment adjustment video segment in the target video based on the content attractiveness representation information.

The content attractiveness representation information about the target video may include audio information about the target video and the user interaction information about the target video.

Figure 3E:
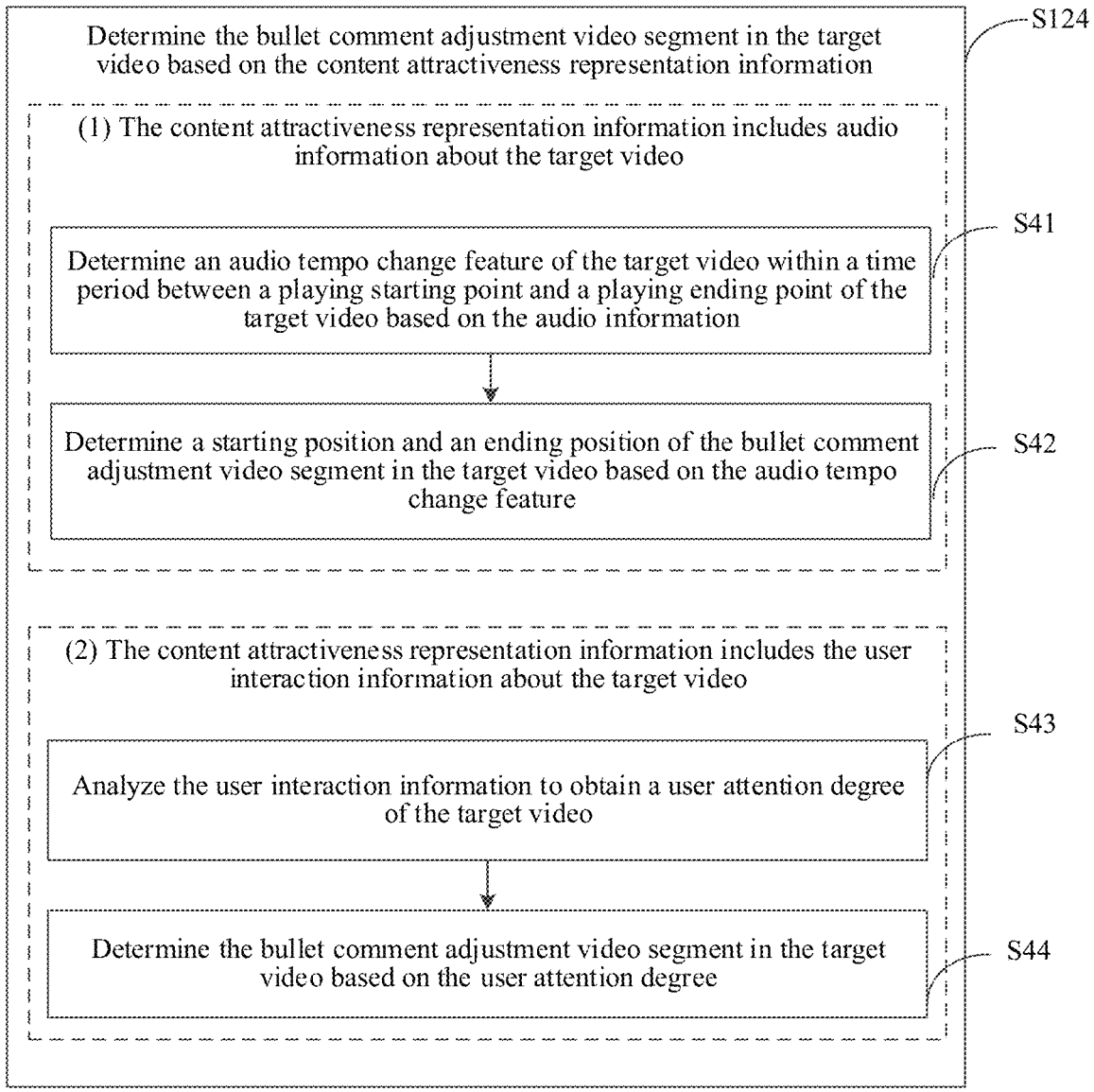

In one embodiment, step S12 may be specifically: the server determines the starting position information and the ending position information about the bullet comment adjustment video segment in the target video based on the content attractiveness representation information about the target video, and records, in the video information corresponding to the target video, the starting position information and the ending position information about the bullet comment adjustment video segment in the target video; and the video information is pre-stored in the database of the server, and the server transmits the video information to the terminal when the terminal needs to obtain the starting position information and the ending position information about the bullet comment adjustment video segment in the target video; or may be: the terminal obtains the starting position information and the ending position information about the bullet comment adjustment video segment in the target video from the local database to determine the bullet comment adjustment video segment in the target video; or may be: the terminal or the server determines the bullet comment adjustment video segment of the target video through real-time calculation. For example, in some embodiments, the content attractiveness representation information includes the audio information about the target video. As shown in FIG. 3E, step S124 may include the following steps:

S41: Determine an audio tempo change feature of the target video within a time period between a playing starting point and a playing ending point of the target video based on the audio information.

S42: Determine a starting position and an ending position of the bullet comment adjustment video segment in the target video based on the audio tempo change feature.

Voices in the audio information include voices of background music and voices of character roles. The audio tempo change feature may be a change of voice strength, voice frequency, or the like. In a specific scenario, generally, when video content enters a climax segment, changes of audio tempos in a video become more drastic. This may be specifically represented through a change degree of voice strength and voice frequency.

For example, a corresponding time point at which the strength change of the voices in the audio information is greater than a preset strength change threshold may be used as the starting position of the bullet comment adjustment video segment, and/or, a corresponding time point at which the frequency of the voices in the audio information meets a preset frequency requirement is used as the starting position of the bullet comment adjustment video segment. In addition, a time point that is after the starting position in the target video and that meets a preset bullet comment adjustment video segment ending condition may be used as the ending position of the bullet comment adjustment video segment.

The preset bullet comment adjustment video segment ending condition may be that the strength change of the voices is lower than the preset strength change threshold; and/or that the frequency of the voices does not meet the preset frequency requirement. Alternatively, the preset bullet comment adjustment video segment ending condition may be a preset time point after the starting position of the bullet comment adjustment video segment. For example, a 30 s video segment after a starting position of a bullet comment adjustment video segment is used as the bullet comment adjustment video segment. A time point after the 30 s video segment is used as an ending position of the bullet comment adjustment video segment. It may be understood that the preset bullet comment adjustment video segment ending condition is not limited to the several conditions listed above.

In some embodiments, the content attractiveness representation information includes the user interaction information about the target video. As shown in FIG. 3E, step S124 may include the following steps:

S43: Analyze the user interaction information to obtain a user attention degree of the target video.

S44: Determine the bullet comment adjustment video segment in the target video based on the user attention degree.

The user interaction information may include at least one of the following types: a user comment like quantity (i.e., number of times that a comment is liked by users), bullet comment information, a playing situation of each video segment in the target video, and the like. The bullet comment information may include content of bullet comments, a quantity of the bullet comments, and the like.

The user attention degree may reflect a degree of attention of a user to video content. For example, if a user attention degree of a segment of video content is greatly higher than that of other video content, there is a relatively high probability that the segment of video content is the climax segment of the target video, that is, a bullet comment adjustment video segment in which a relatively large number of video bullet comments may be adjusted.

Figure 3F:
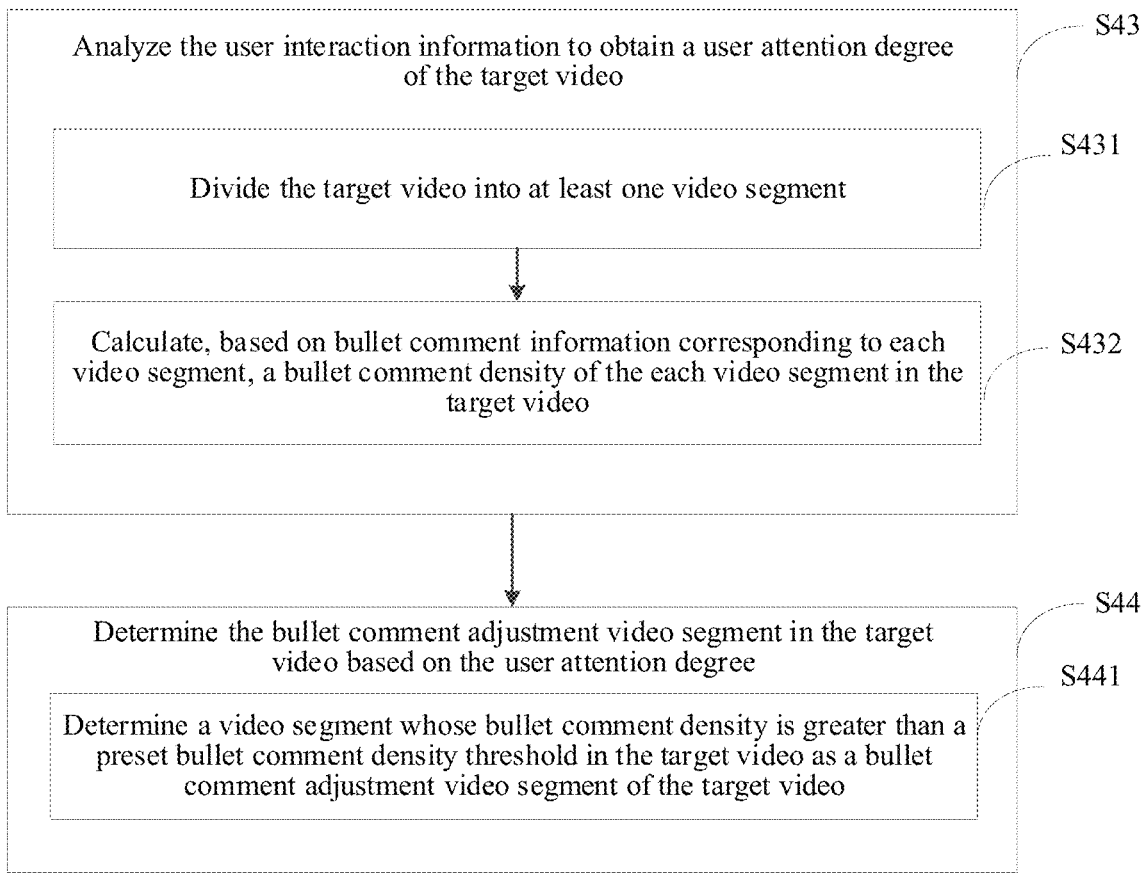

Specifically, the user interaction information includes bullet comment information. As shown in FIG. 3F, step S43 may specifically include the following steps:

S431: Divide the target video into at least one video segment.

S432: Calculate, based on bullet comment information corresponding to each video segment, a bullet comment density of the each video segment in the target video.

Step S44 includes the following step:

S441: Determine a video segment whose bullet comment density is greater than a preset bullet comment density threshold in the target video as a bullet comment adjustment video segment of the target video.

The video segment is obtained through pre-division. Starting position information and ending position information about each video segment have been explicit. When a bullet comment adjustment video segment is determined, starting position information and ending position information about the bullet comment adjustment video segment in the target video may be obtained.

Step S431 may include: dividing the target video into at least one video segment having a duration of T by using a fixed-duration video division method, T being a preset duration of a video segment obtained through division; or dividing the target video into N video segments, N being a preset quantity of video segments obtained through division.

For example, the target video may be divided into one or more 30 s video segments having 30 s used as a unit duration by using the fixed-duration video division method. The quantity of video segments obtained through division is larger when a duration of the target video is longer. In another example, the target video is divided into a certain quantity of video segments. For example, the target video is divided into 10 video segments. A duration of the video segment obtained through division is longer when the duration of the target video is longer.

A specific formula of calculating a bullet comment density is as follows:

$$\text{Bullet comment density} = \text{Total bullet comment quantity} / \text{Analysis duration}.$$

The bullet comment density calculation method is generally to determine, for a case that some bullet comments are accumulated in the target video, popularity of video content of each video segment by analyzing a density of bullet comments of the each video segment in the target video, to obtain the bullet comment adjustment video segment of the target video. Popularity is higher when a bullet comment density is higher.

For example, the target video is divided into one or more video segments having a specified analysis duration by using the fixed-duration video division method. For example, if the specified analysis duration is 30 s, a 5-minute video may be divided into 10 segments. A bullet comment density of each video segment after division is calculated by using the calculation formula shown above. In one embodiment, the total bullet comment quantity in the formula refers to a total bullet comment quantity of a video segment, that is, a total bullet comment quantity of a video segment within 30 s, and the analysis duration is 30 s. The bullet comment density obtained through calculation is compared with a preset bullet comment density threshold. When the bullet comment density is higher than the preset bullet comment density threshold, the video segment is labeled as a bullet comment adjustment video segment.

The preset bullet comment density threshold may be set according to an actual situation, for example, may be set according to a total bullet comment quantity of the target video and a total duration of the target video. This is not limited herein. For example, if the total bullet comment quantity of the target video is 2000, the total duration is 5 minutes, and the preset bullet comment density threshold may be set to 500/minute, a video segment having a bullet comment density that is higher than 500/minute is labeled as a bullet comment adjustment video segment of the target video.

Figure 3G:
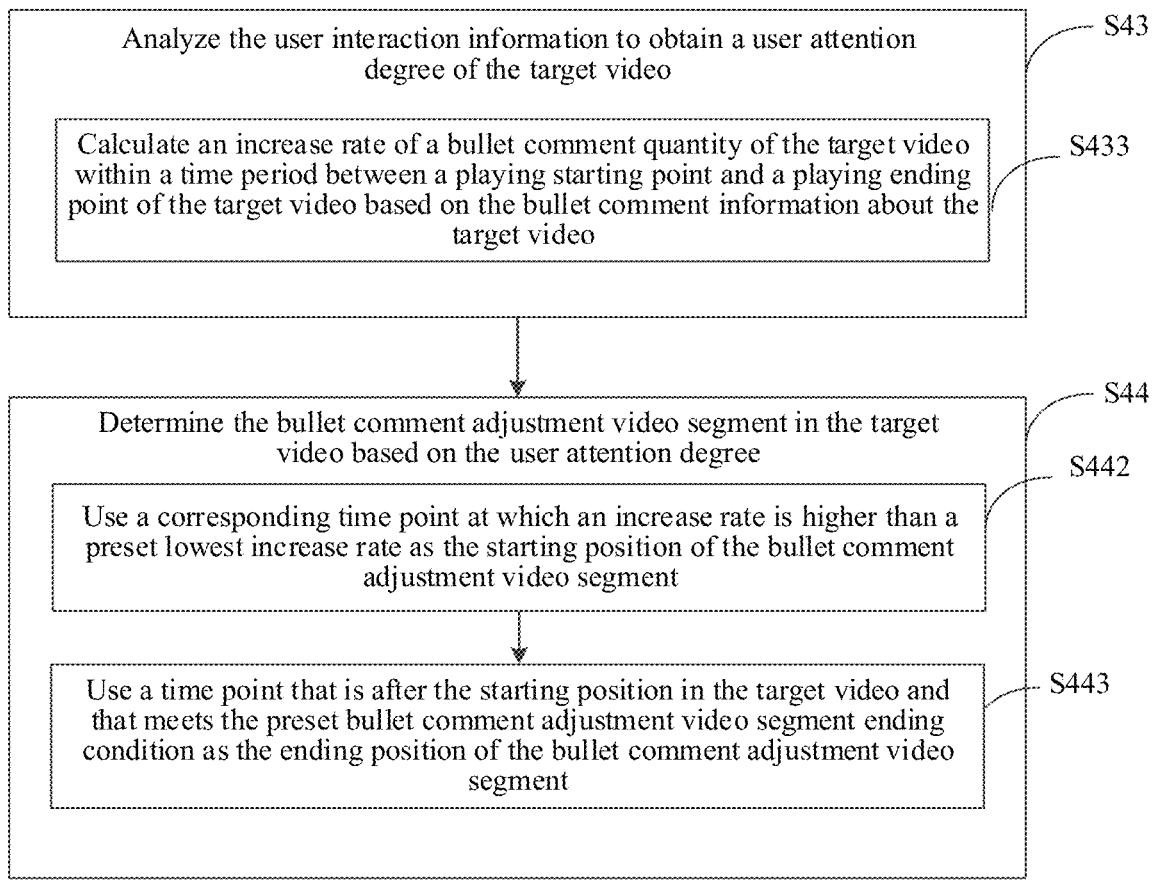

In some other embodiments, the user interaction information includes bullet comment information. As shown in FIG. 3G, step S43 may include the following step:

S433: Calculate an increase rate of a bullet comment quantity of the target video within a time period between a playing starting point and a playing ending point of the target video based on the bullet comment information about the target video.

Step S44 includes the following steps:

S442: Use a corresponding time point at which an increase rate is higher than a preset lowest increase rate as the starting position of the bullet comment adjustment video segment.

S443: Use a time point that is after the starting position in the target video and that meets the preset bullet comment adjustment video segment ending condition as the ending position of the bullet comment adjustment video segment.

A playing time of the target video may be used as an abscissa, and a bullet comment quantity may be used as an ordinate to obtain a curve indicating that the bullet comment quantity changes with the increase of the playing time of the target video. An increase rate of the bullet comment quantity may be obtained by calculating a slope of the curve. The starting position of the bullet comment adjustment video segment may be obtained by comparing the increase rate with the preset lowest increase rate.

The preset lowest increase rate may be set according to an actual situation. This is not limited herein.

In one embodiment, the preset bullet comment adjustment video segment ending condition may be that the increase rate of the bullet comment quantity is less than a preset negative increase rate; or that a bullet comment quantity within a preset time period is less than the preset bullet comment quantity. Alternatively, the preset bullet comment adjustment video segment ending condition may be a preset time point after the starting position of the bullet comment adjustment video segment. For example, a 30 s video segment after a starting position of a bullet comment adjustment video segment is used as the bullet comment adjustment video segment. A time point after the 30 s video segment is used as an ending position of the bullet comment adjustment video segment. It may be understood that the preset bullet comment adjustment video segment ending condition is not limited to the several conditions listed above.

Figure 3H:
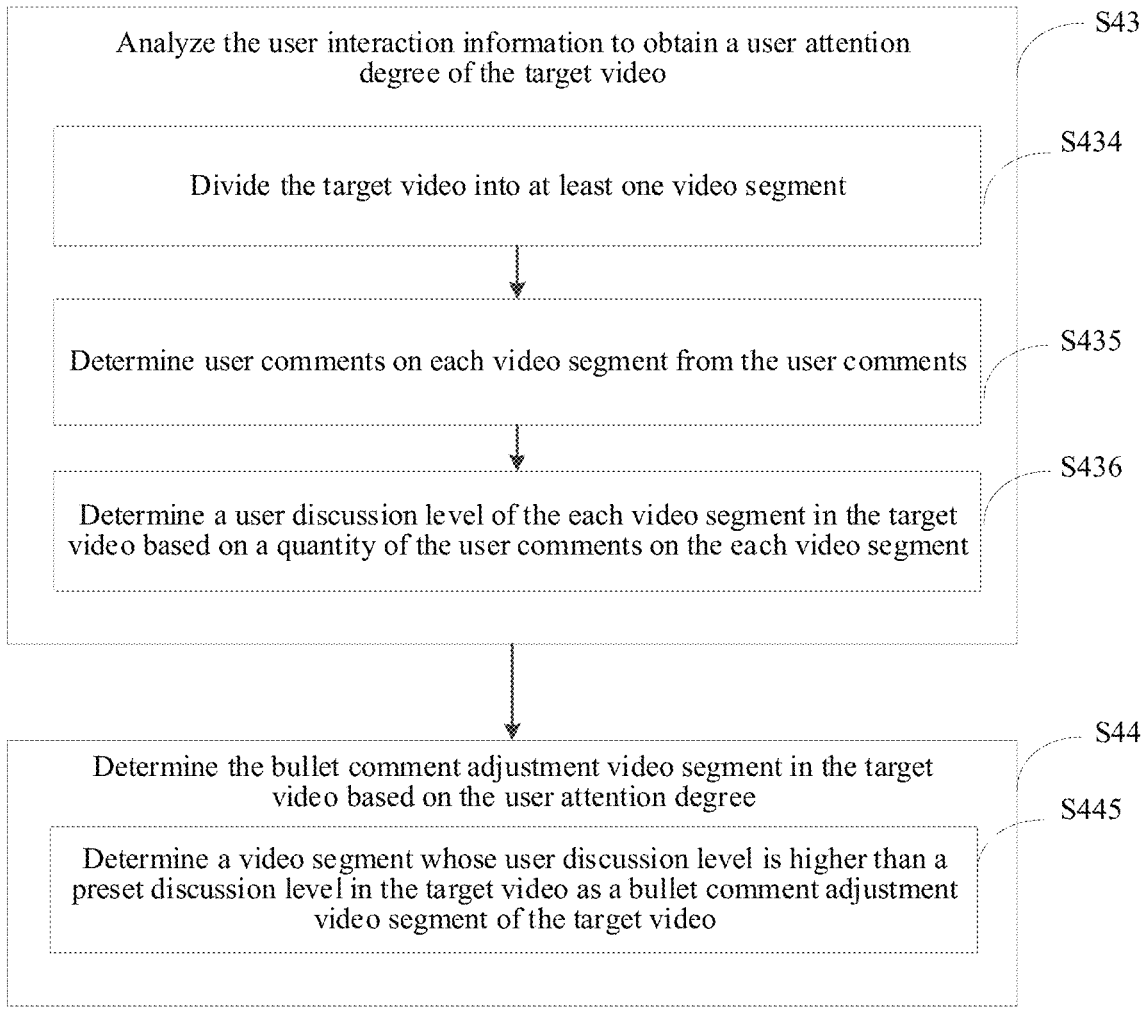

In some embodiments, when extracted user interaction information is user comments, as shown in FIG. 3H, step S43 may specifically include the following steps:

S434: Divide the target video into at least one video segment.

S435: Determine user comments on each video segment from the user comments.

S436: Determine a user discussion level of the each video segment in the target video based on a quantity of the user comments on the each video segment.

Step S44 includes the following step:

S445: Determine a video segment whose user discussion level is higher than a preset discussion level in the target video as a bullet comment adjustment video segment of the target video.

The comment quantity may be used as information for reflecting the user discussion level. If the user comment quantity is large, the user discussion level is high. Otherwise, if the user comment quantity is small, the user discussion level is low.

The preset discussion level may be set according to an actual situation, for example, may be set according to a total comment quantity of the target video, a total duration of the target video and a duration of a video segment. This is not limited herein. For example, if the total comment quantity of the target video is 1000, the total duration is 15 minutes, and the duration of the video segment is 3 minutes, the preset discussion level may be set to 300 user comments. If a user comment quantity of a video segment is more than 300, the video segment may be labeled as a bullet comment adjustment video segment of the target video.

Figure 3I:
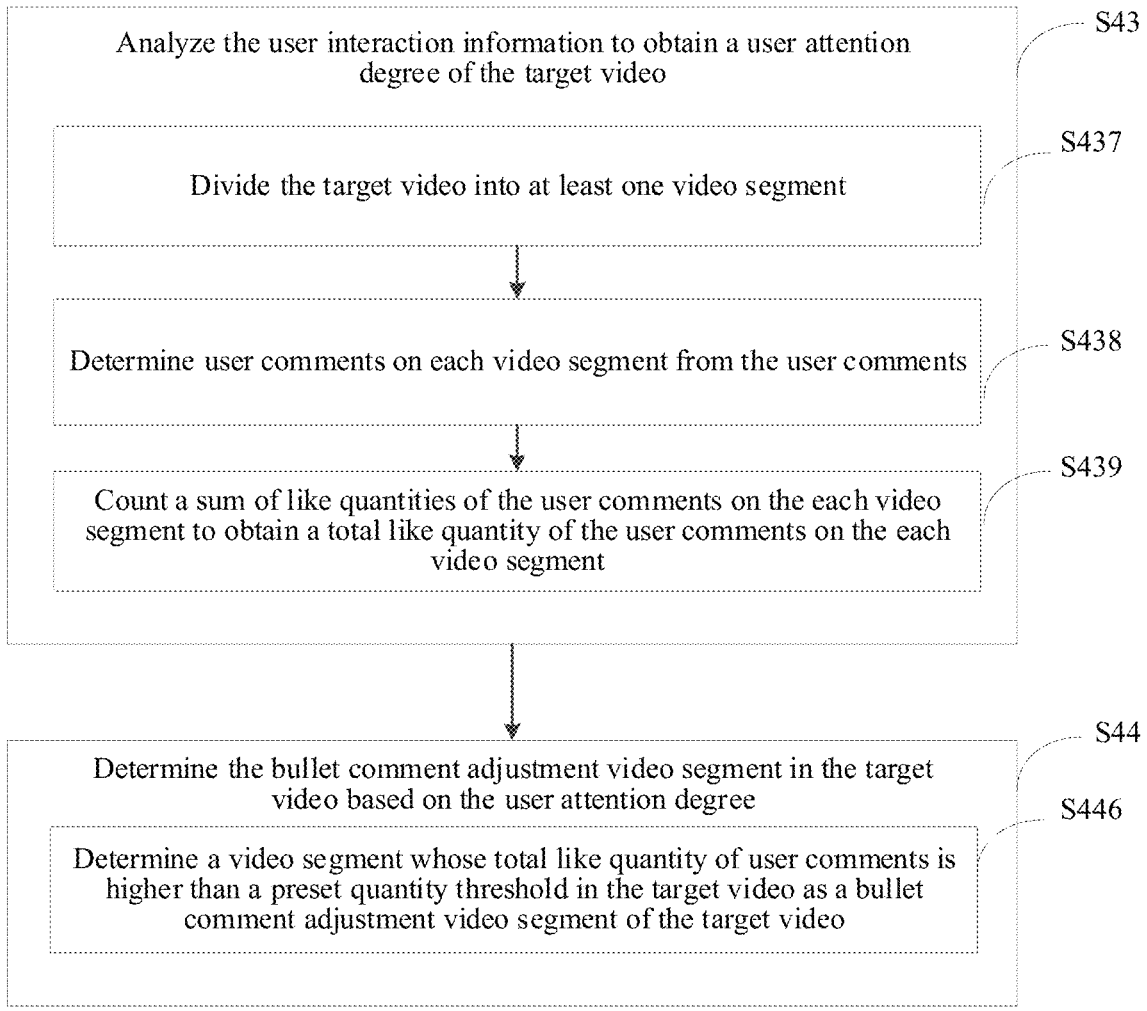

In some embodiments, the user interaction information may include a user comment like quantity. That is, a quantity indicating how many times a comment is liked by users. As shown in FIG. 3I, step S43 may specifically include the following steps:

S437: Divide the target video into at least one video segment.

S438: Determine user comments on each video segment from the user comments.

S439: Count a sum of like quantities of the user comments on the each video segment to obtain a total like quantity of the user comments on the each video segment.

Step S44 includes the following step:

S446: Determine a video segment whose total like quantity of user comments is higher than a preset quantity threshold in the target video as a bullet comment adjustment video segment of the target video.

The user comment like quantity may reflect a degree of attention of a user to video content. A larger user comment like quantity indicates a higher degree of attention of the user to comment content, that is, a higher degree of attention to a video segment corresponding to the comment content is relatively high. A user attention degree of the each video segment may be more accurately reflected by counting the total like quantity of the user comments on the each video segment.

The preset quantity threshold may be set according to an actual situation. This is not limited herein. For example, the preset quantity threshold may be set according to a sum of like quantities of all comments on the target video.

Figure 3J:
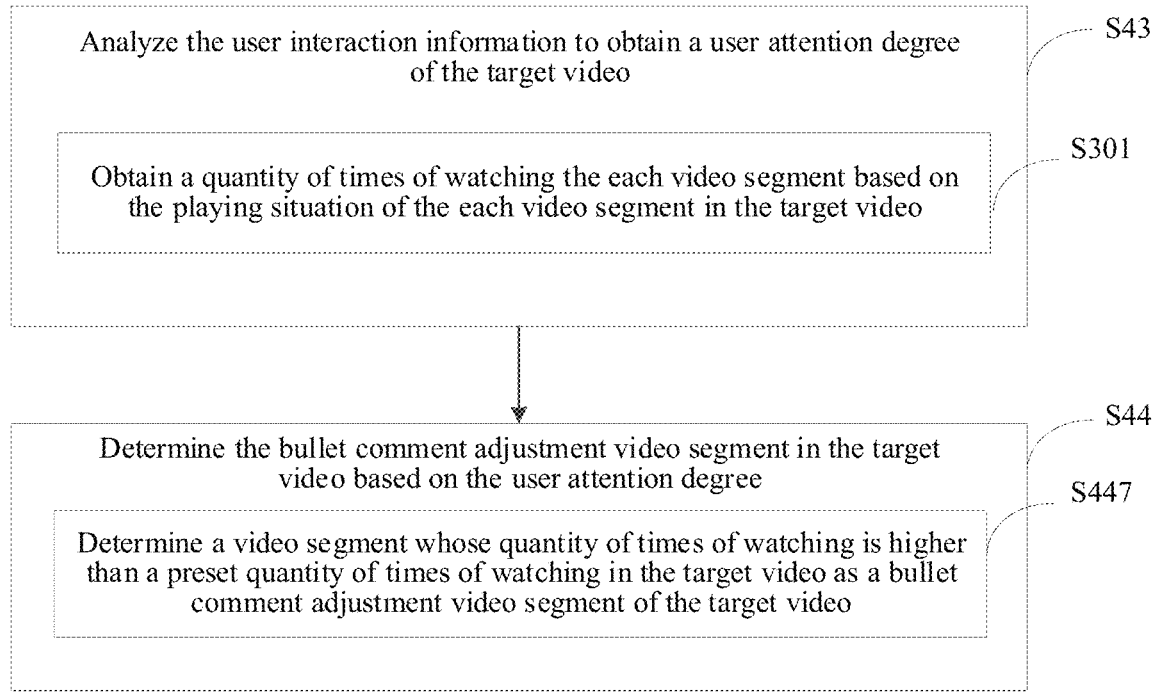

In some embodiments, the user interaction information includes a playing situation of each video segment in the target video. As shown in FIG. 3J, step S43 may specifically include the following step:

S301: Obtain a quantity of times of watching the each video segment based on the playing situation of the each video segment in the target video.

Step S44 includes the following step:

S447: Determine a video segment whose quantity of times of watching is higher than a preset quantity of times of watching in the target video as a bullet comment adjustment video segment of the target video.

The quantity of times of watching the each video segment is specifically a quantity of times of validly watching the each video segment. The quantity of times of valid watching may be set according to an actual requirement. This is not limited herein. For example, one time of valid watching is counted when a watching ratio of content of a video segment is more than 50%. Alternatively, one time of valid watching is counted when a video segment is played once. That is, one time of valid watching is counted when the video segment has been played.

The preset quantity of times of watching may be set according to an actual situation. This is not limited herein. For example, the preset quantity of times of watching may be specifically set according to a total playing quantity of the target video. In one embodiment, a bullet comment adjustment video segment of the target video may alternatively be determined by performing a multidimensional analysis based on the video information. For example, a pre-selected bullet comment adjustment video segment of the target video may be determined based on the audio information, which is included in the video information, about the target video; and/or a pre-selected bullet comment adjustment video segment of the target video may be determined based on the user interaction information about the target video; and/or a pre-selected bullet comment adjustment video segment of the target video may be determined in a human intervention manner. A pre-selected bullet comment adjustment video segment meeting a preset condition is selected as the bullet comment adjustment video segment of the target video from the pre-selected bullet comment adjustment video segments of the target video through analyses in dimensions.

The pre-selected bullet comment adjustment video segment meeting the preset condition may be a pre-selected bullet comment adjustment video segment meeting pre-selected bullet comment adjustment video segment requirements in all dimensions. Alternatively, pre-selected bullet comment adjustment video segments are transmitted to a detection terminal, the detection terminal checks the pre-selected bullet comment adjustment video segments, and a pre-selected bullet comment adjustment video segment that meets the preset condition after the check is determined as the bullet comment adjustment video segment of the video. For example, pre-selected bullet comment adjustment video segments may be manually checked. Operation personnel may label, from the perspective of the operation personnel, a video segment considered as a bullet comment adjustment video segment. The operation personnel may alternatively browse pre-selected bullet comment adjustment video segments, and delete pre-selected bullet comment adjustment video segments that are not real bullet comment adjustment video segments from the pre-selected bullet comment adjustment video segments, to obtain a bullet comment adjustment video segment of the target video.

In one embodiment, there is neither a specific time sequence between nor a specific limitation on a quantity of analysis times of the foregoing solutions of determining the bullet comment adjustment video segment of the target video from all the dimensions. In one embodiment, the bullet comment adjustment video segment of the target video may be determined only from a one-dimensional analysis. Alternatively, the bullet comment adjustment video segment of the target video may be determined from a multidimensional analysis.

For example, before the video is launched, a bullet comment adjustment video segment of the target video may be labeled in a human labeling manner. After the video has been launched for a period of time, for example, for one month, two months, or one year, the bullet comment adjustment video segment of the target video may be labeled based on the user interaction information of the target video, or may be labeled in the human labeling manner.

In some embodiments, before step S123, the method may further include:

displaying an analysis information setting page of the bullet comment adjustment video segment;

determining video identification information about the target video, a video segment division parameter of the target video, and the corresponding preset bullet comment density threshold based on an analysis information setting operation performed by the user on the analysis information setting page;

the obtaining video information about the target video comprises:
obtaining the video information about the target video based on the video identification information; and
the dividing the target video into at least one video segment comprises:
dividing the target video into at least one video segment based on the video segment division parameter.

Figure 6:
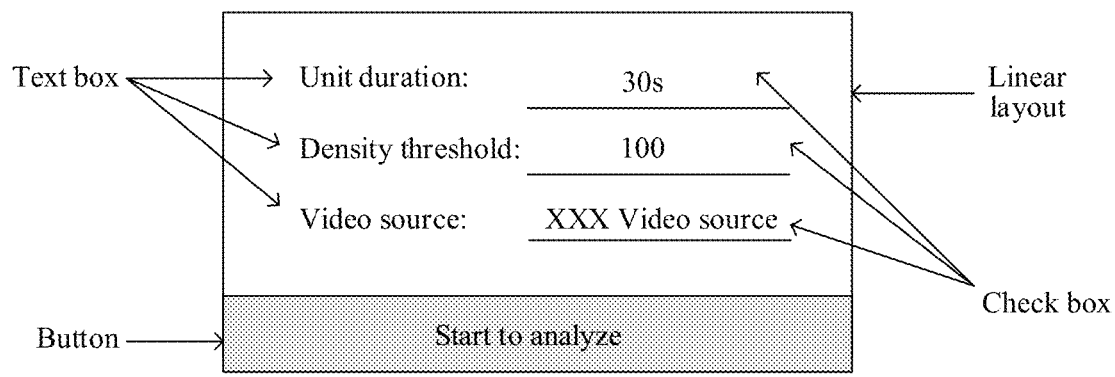
FIG. 6 is a schematic diagram of a user interface of an analysis information setting page of a bullet comment adjustment video segment according to an embodiment of the present disclosure.

FIG. 6 shows a user interface (UI) model of the analysis information setting page. A root container of the UI layout is a linear layout. The root container can enable internal views to be sequentially presented in a horizontal or vertical arrangement manner. In the UI in FIG. 6, the vertical arrangement manner is used. A unit duration component, a density threshold component, and a video source component are sequentially placed in the UI. An analysis button is at the bottom of the UI. The bullet comment density of the target video may be analyzed by tapping the analysis button after information about the unit duration component, information about the density threshold component, and information about the video source component are all configured completely, to obtain the starting position information and the ending position information, in the target video, about the bullet comment adjustment video segment of the target video.

The unit duration component may be configured to set the video segment division parameter of the target video, for example, may set an analysis duration of a video segment. If a set analysis duration is 30 s, the total duration of the target video is divided into one or more time periods by using 30 s as a unit duration. Each time period corresponds to a video segment. For example, if the total duration of the target video is 5 minutes, the target video is divided into 10 video segments. If a video segment after an analysis is determined as a bullet comment adjustment video segment of the target video, the bullet comment display parameter is adjusted within 30 s corresponding to the bullet comment adjustment video segment. It may be understood that another analysis duration such as 10 s or 1 minute may alternatively be set through the unit duration component. This is not limited herein.

The density threshold component may be configured to set the preset bullet comment density threshold. If an inputted preset bullet comment density threshold is 100/second, an average bullet comment quantity of a bullet comment adjustment video segment obtained after an analysis is to be more than 100 per second. It may be understood that the preset bullet comment density threshold may be set to another value, such as 50/second. This is not limited herein.

The video source component may be configured to obtain the video identification information about the target video. A selection page of the target video is displayed when a triggering operation performed by a user on the video source component on the analysis information setting page is detected. The video identification information about the target video is obtained based on a determining operation performed by the user on the selection page of the target video, and a return is made from the selection page to the analysis information setting page. The video information about the target video is obtained according to the video identification information about the target video when the user triggers the analysis button on the analysis information setting page.

In one embodiment, the video source component may obtain video identification information about a single video, or may obtain video identification information about a plurality of videos. For example, a folder may be selected on the selection page. The folder has a plurality of videos. The video source component obtains video identification information corresponding to all the videos in the folder through a determining operation performed on the folder.

One embodiment may be implemented through a model view controller (MVC) mode. The MVC is to organize code by using a method for separating business logic, data, and interface display, and may be used for mapping conventional input, processing, and output functions into a logical graphical UI structure. A MVC mode architecture includes three layers: a presentation layer, a control layer, and a data layer.

The presentation layer may be configured to present data and interact with users. A presentation layer on a side of the server is mainly configured to display the analysis information setting page of the bullet comment adjustment video segment. A presentation layer on a side of the terminal is mainly to add a switch of a smart bullet comment adjustment mode to the present disclosure. Users may use the video playing method provided in the present disclosure by switching on the smart bullet comment adjustment mode.

The data layer is mainly configured to interact with a database and perform operations such as creating, updating, reading, and deleting data. In one embodiment, data includes the bullet comment density of the each video segment obtained after dividing the target video, the starting position information and the ending position information about the bullet comment adjustment video segment in the target video, and the like. For example, if the total duration of the target video is 20 minutes, the analysis duration is 30 s, and a bullet comment density of a video segment between 10:30 and 11:00 is higher than the preset bullet comment density, the video segment may be used as a bullet comment adjustment video segment of the target video. There may be a plurality of bullet comment adjustment video segments in a target video. Data of time periods of the plurality of bullet comment adjustment video segments finally obtained through an analysis may be stored in a database in a data list form, until the data layer returns the data found in the database when the terminal requests to obtain the data.

The control layer may call the data layer and the presentation layer to interact with each other. For example, the control layer may control data to flow to the data layer, and may return, when the data changes, the changed data to the presentation layer to update the data displayed by the presentation layer. As shown in Table 1, it may be learned from such a drawing that DanmuSamplingMgr as a control class includes data of a time period data list (mTimeList) of the bullet comment adjustment video segment, a user interface (mUIView), data of other configuration items, and the like. Functions of DanmuSamplingMgr may include: creating a UI, collecting configuration information, starting a bullet comment density analysis, writing data into a database, and the like. DanmuSamplingMgr as a control class may combine functions of the data layer and the presentation layer, and encapsulate the functions into a class to be externally called. In this way, the logic and the UI may be separated to implement decoupling.

TABLE 1

| DanmuSamplingMgr |
| --- |
| – mSampleDuration:int |
| – mthresHold:int |
| – mSrc:String |
| – mTimeList:ArrayList<String> |
| – mUIView:Dialog |

TABLE 1-continued

DanmuSamplingMgr

+ getDuration( ):int
+ getSrc( ):ArrayList<String>
+ getThresHold( ):float
+ startAnalyzing( ):void
+ saveTime( ):boolean It may be learned from the above that in one embodiment, the target video is played; and according to starting position information and ending position information about a bullet comment adjustment video segment in the target video, a bullet comment display effect corresponding to the bullet comment adjustment video segment is controlled when the target video is played to the bullet comment adjustment video segment, to adjust a blocking degree of the bullet comments blocking the bullet comment adjustment video segment in a display region of the target video. In the present disclosure, in a bullet comment adjustment video segment of a video, a bullet comment display effect corresponding to the bullet comment adjustment video segment may be controlled to make the effect better meet user watching requirements.

In one embodiment, description is made by using an example in which a video playing method is performed by a server. Specifically, a video playing apparatus may be specifically integrated in the server.

Figure 7:
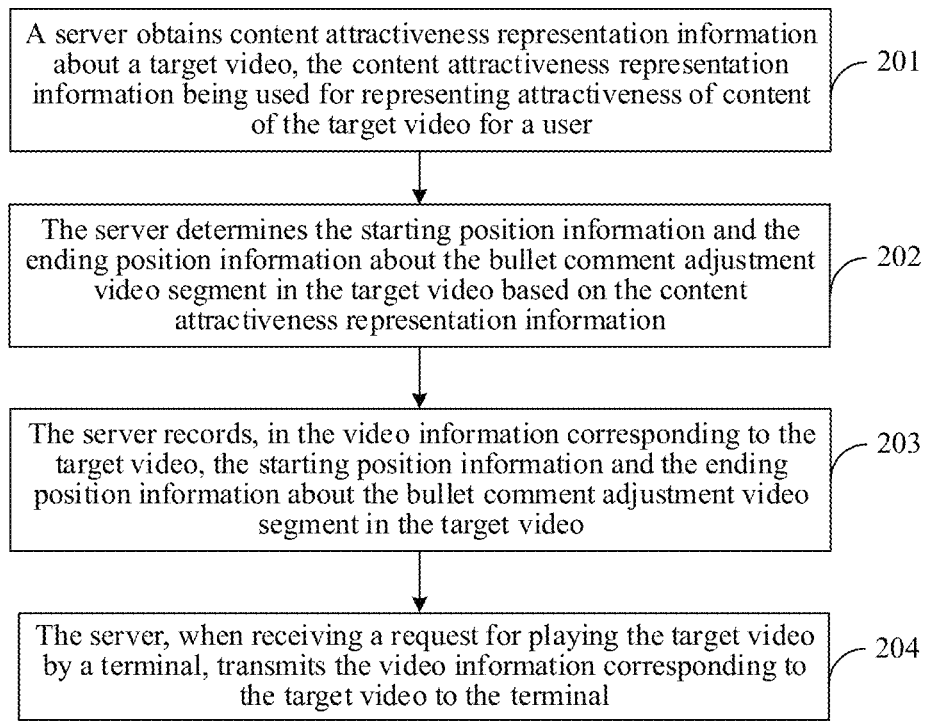
FIG. 7 is another flowchart of a video playing method according to an embodiment of the present disclosure.

One embodiment of the present disclosure provides a video playing method. As shown in FIG. 7, a specific process of the video playing method may be as follows:

201: The server obtains content attractiveness representation information about a target video, the content attractiveness representation information being used for representing attractiveness of content of the target video for a user.

The content attractiveness representation information about the target video may include audio information about the target video and the user interaction information about the target video.

In one embodiment, the server obtains the content attractiveness representation information in many manners.

For example, the content attractiveness representation information may be obtained from a local database. For example, if the content attractiveness representation information is stored in the local database, the content attractiveness representation information may be directly obtained from the database when an instruction of obtaining the content attractiveness representation information is received.

For example, the content attractiveness representation information may alternatively be obtained by another device and then provided to the server. That is, the server may receive the content attractiveness representation information transmitted from the another device. For example, specifically, the content attractiveness representation information may be stored in a shared ledger of a blockchain. When the content attractiveness representation information needs to be obtained, the content attractiveness representation information is extracted from the shared ledger of the blockchain and provided to the server.

The user interaction information in one embodiment may include at least one of the following types: user comments, a user comment like quantity, bullet comment information, a playing situation of each video segment in the target video, and the like.

In some embodiments, audio information may alternatively be extracted from the target video by directly obtaining the target video.

202: The server determines the starting position information and the ending position information about the bullet comment adjustment video segment in the target video based on the content attractiveness representation information.

In some embodiments, the content attractiveness representation information includes the audio information about the target video. Step 202 may include:
    obtaining the audio information about the target video;
    determining an audio tempo change feature of the target video within a time period between a playing starting point and a playing ending point of the target video based on the audio information; and
    determining the starting position information and the ending position information about the bullet comment adjustment video segment in the target video based on the audio tempo change feature.

For a specific implementation, refer to description in step 102. Details are not described herein again.

In some embodiments, the content attractiveness representation information includes user interaction information about the target video. Step 202 may include:
    analyzing the user interaction information to obtain a user attention degree of the target video; and
    determining the starting position information and the ending position information about the bullet comment adjustment video segment in the target video based on the user attention degree.

For a specific process, refer to the embodiment in step 102 on a side of a terminal. Details are not described herein again.

In one embodiment, before step 201, the method may further include:
    displaying, by the server, an analysis information setting page of the bullet comment adjustment video segment; and
    determining, by the server, video identification information about the target video, a video segment division parameter of the target video, and the corresponding preset bullet comment density threshold based on an analysis information setting operation performed by the user on the analysis information setting page.

The obtaining, by the server, video information about the target video includes:
    obtaining, by the server, the video information about the target video based on the video identification information.

The dividing the target video into at least one video segment comprises:
    dividing, by the server, the target video into at least one video segment based on the video segment division parameter.

203: The server records, in the video information corresponding to the target video, the starting position information and the ending position information about the bullet comment adjustment video segment in the target video.

In one embodiment, the server may record, in the video information corresponding to the target video, the starting position information and the ending position information about the bullet comment adjustment video segment in the target video, and then store the video information in a database.

In some embodiments, before step 203, the method may further include:

setting the bullet comment display parameter corresponding to the bullet comment adjustment video segment to obtain a preset bullet comment display parameter; and recording the preset bullet comment display parameter in the video information corresponding to the target video.

The preset bullet comment display parameter may include at least one of the following types: a preset bullet comment display region, a preset bullet comment speed, a preset bullet comment font size, and preset bullet comment transparency. Each preset bullet comment display parameter may be set according to an actual requirement. For example, the preset bullet comment display parameter may be set according to a requirement of decreasing a blocking degree of blocking, by bullet comments, the target video to a certain threshold. This is not limited herein.

For example, in the preset bullet comment display parameters, the preset bullet comment display region may be set to ¼ of the target video display screen, the preset bullet comment speed may be set to a relatively low preset speed, the preset bullet comment font size may be set to 50% of a standard font size, and the preset bullet comment transparency may be set to 50%. In another example, there may be no bullet comment displayed in the bullet comment adjustment video segment of the target video by setting the preset bullet comment transparency to 100%. For a specific embodiment, refer to description in step 103. Details are not described herein again.

204: The server, when receiving a request for playing the target video by a terminal, transmits the video information corresponding to the target video to the terminal.

The video information may include video content of the target video, the user interaction information of the target video, the starting position information and the ending position information, in the target video, about the bullet comment adjustment video segment of the target video, and the like. The video content of the target video may include image information, audio information, and subtitle information about the target video.

The terminal, when receiving the video information about the target video, plays the video content of the target video, and controls the bullet comment display effect corresponding to the bullet comment adjustment video segment when the target video is played to the bullet comment adjustment video segment.

For the solution of determining the bullet comment adjustment video segment in the target video by the terminal, refer to the related description in the previous embodiment. Details are not described herein again.

In one embodiment, the server, when receiving a request for playing the target video by the terminal, may obtain the video information corresponding to the target video from the local database and transmit the video information to the terminal.

Figure 8:
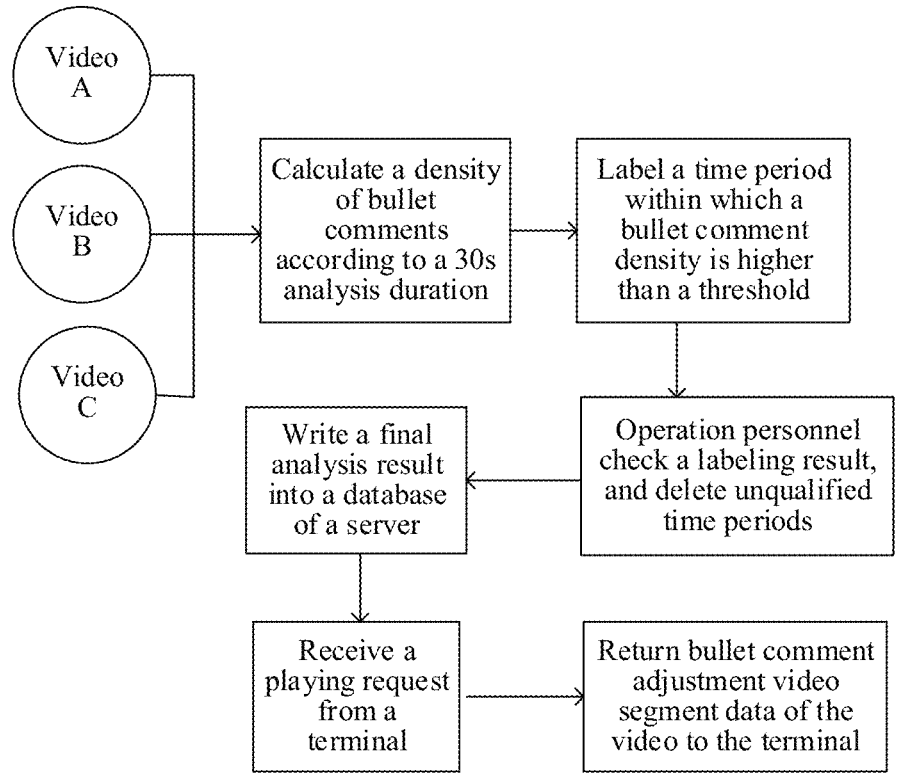
FIG. 8 is another flowchart of a video playing method according to an embodiment of the present disclosure.

For example, in a specific scenario, as shown in FIG. 8, the server may divide the target video into N video segments, for example, three video segments: a video A, a video B, and a video C, where a duration of each video segment is 30 s, that is, an analysis duration is 30 s, or divide a video bullet comment list of the target video according to a set analysis duration; and calculate a bullet comment density of the each video segment, and label video segments of which bullet comment densities are higher than a preset bullet comment density threshold as pre-selected bullet comment adjustment video segments. Operation personnel check the pre-selected bullet comment adjustment video segments after the labeling, and delete pre-selected bullet comment adjustment video segments that are not real bullet comment adjustment video segments from the pre-selected bullet comment adjustment video segments after the labeling, to obtain the bullet comment adjustment video segment of the target video; write starting position information and ending position information about the bullet comment adjustment video segment as an analysis result into the database of the server; and transmit the starting position information and the ending position information about the bullet comment adjustment video segment of the target video to the terminal when the request for playing the target video by the terminal is received.

It may be learned from the above that the server in one embodiment may obtain the content attractiveness representation information about the target video, the content attractiveness representation information being used for representing attractiveness of content of the target video for a user; determine the starting position information and the ending position information about the bullet comment adjustment video segment in the target video based on the content attractiveness representation information; record, in the video information corresponding to the target video, the starting position information and the ending position information about the bullet comment adjustment video segment in the target video; and transmit, when receiving a request for playing the target video by the terminal, the video information corresponding to the target video to the terminal. In the present disclosure, in a bullet comment adjustment video segment of a video, a bullet comment display effect corresponding to the bullet comment adjustment video segment may be controlled to make the effect better meet user watching requirements.

Figure 9A:
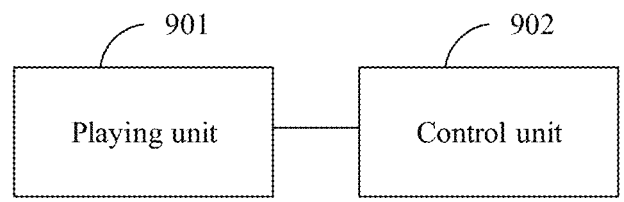
FIG. 9A is a schematic structural diagram of a video playing apparatus according to an embodiment of the present disclosure.

To better perform the foregoing method, one embodiment of the present disclosure further provides a video playing apparatus. The video playing apparatus may be specifically integrated in a device such as a terminal. As shown in FIG. 9A, the video playing apparatus may include a playing unit 901 and a control unit 902 as follows:

The playing unit 901 is configured to play a target video.

Neither a video type nor a video duration of the target video is limited. The target video may be played on a video client, or a browser client.

The control unit 902 is configured to control, according to a playing progress of the target video, and starting position information and ending position information about a bullet comment adjustment video segment in the target video, a bullet comment display effect corresponding to the bullet comment adjustment video segment when the target video is played to the bullet comment adjustment video segment, to adjust a blocking degree of the bullet comments blocking the bullet comment adjustment video segment in a display region of the target video.

In some embodiments, the control unit 902 may specifically control, by adjusting a bullet comment display parameter corresponding to the bullet comment adjustment video segment, the bullet comment display effect when the target video is played to the bullet comment adjustment video segment, to adjust a blocking degree of the bullet comments blocking the bullet comment adjustment video segment in a display region of the target video.

The bullet comment display parameter may include at least one of the following parameters: a bullet comment display region, a bullet comment speed, a bullet comment font size, and bullet comment transparency.

Figure 9B:
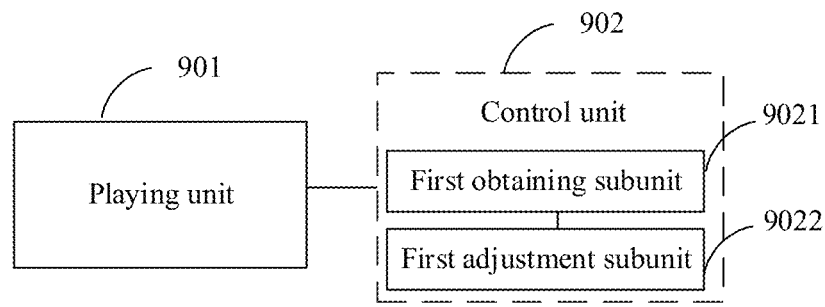
FIG. 9B is another schematic structural diagram of the video playing apparatus according to an embodiment of the present disclosure.

In some embodiments, referring to FIG. 9B, the control unit 902 may include a first obtaining subunit 9021 and a first adjustment subunit 9022 as follows:

The first obtaining subunit 9021 is configured to obtain a preset bullet comment display parameter corresponding to the bullet comment adjustment video segment.

The first adjustment subunit 9022 is configured to adjust the bullet comment display parameter corresponding to the bullet comment adjustment video segment to the preset bullet comment display parameter when the target video is played to the bullet comment adjustment video segment, to control the bullet comment display effect.

Figure 9C:
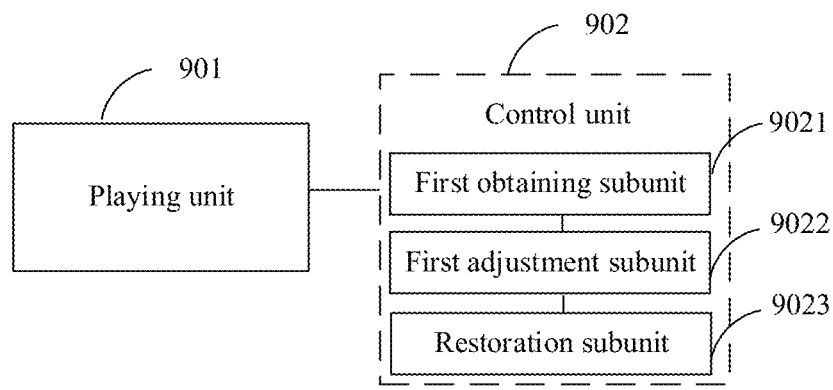
FIG. 9C is another schematic structural diagram of the video playing apparatus according to an embodiment of the present disclosure.

In some embodiments, referring to FIG. 9C, the control unit 902 may further include a restoration subunit 9023 as follows:

The restoration subunit 9023 is configured to restore, at the time of completing playing the bullet comment adjustment video segment, the bullet comment display effect to a bullet comment display effect before the bullet comment adjustment video segment is displayed.

Figure 9D:
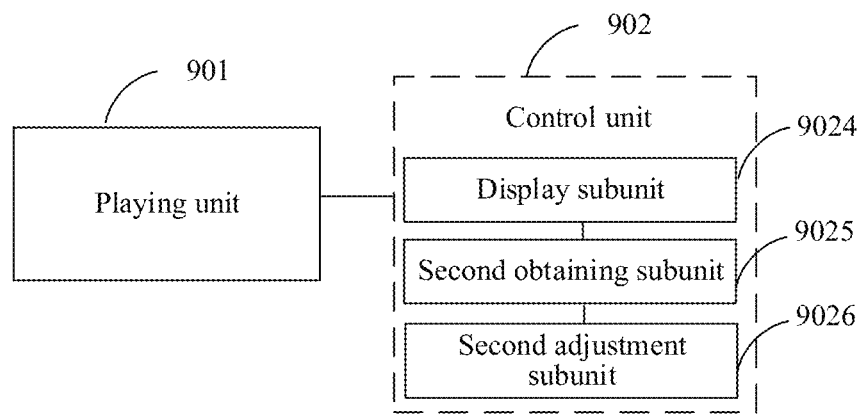
FIG. 9D is another schematic structural diagram of the video playing apparatus according to an embodiment of the present disclosure.

In some embodiments, referring to FIG. 9D, the control unit 902 may include a display subunit 9024, a second obtaining subunit 9025 and a second adjustment subunit 9026 as follows:

The display subunit 9024 is configured to display a bullet comment display parameter setting page on a playing page of the target video at the time of determining, according to the starting position information and the ending position information about the bullet comment adjustment video segment in the target video, that the target video is played to the bullet comment adjustment video segment.

The second obtaining subunit 9025 is configured to obtain, based on a bullet comment display parameter setting operation performed by a user on the bullet comment display parameter setting page, a target bullet comment display parameter set by the user.

The second adjustment subunit 9026 is configured to adjust a bullet comment display parameter of the bullet comment adjustment video segment to the target bullet comment display parameter.

Figure 9E:
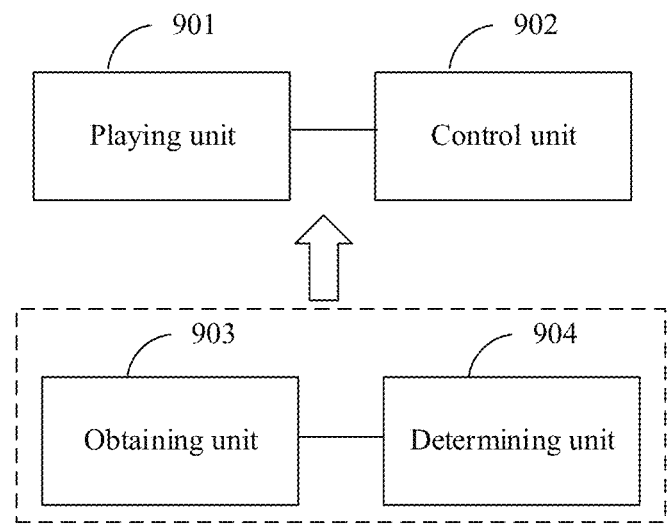
FIG. 9E is another schematic structural diagram of the video playing apparatus according to an embodiment of the present disclosure.

In some embodiments, referring to FIG. 9E, the video playing apparatus may further include an obtaining unit 903 and a determining unit 904 as follows:

The obtaining unit 903 is configured to obtain video information about the target video.

The determining unit 904 is configured to determine, based on the video information, the bullet comment adjustment video segment in which bullet comments need to be adjusted in the target video.

The video information may include video content of the target video, user interaction information of the target video, and the like. The user interaction information may include at least one of the following types: a user comment like quantity, bullet comment information, a playing situation of each video segment in the target video, and the like. The video content of the target video may include image information, audio information, and subtitle information about the target video.

In some embodiments, the video information includes the starting position information and the ending position information, in the target video, about the bullet comment adjustment video segment of the target video; and the determining unit 904 may be specifically configured to determine a starting position and an ending position, in the target video, of the bullet comment adjustment video segment of the target video based on the starting position information and the ending position information; and determine the bullet comment adjustment video segment in the target video according to the starting position and the ending position.

In some embodiments of the present disclosure, the video information includes content attractiveness representation information about the target video, and the content attractiveness representation information is used for representing attractiveness of content of the target video for a user; and the determining unit 904 may be specifically configured to extract the content attractiveness representation information about the target video from the video information; and determine the bullet comment adjustment video segment in the target video based on the content attractiveness representation information.

Figure 9F:
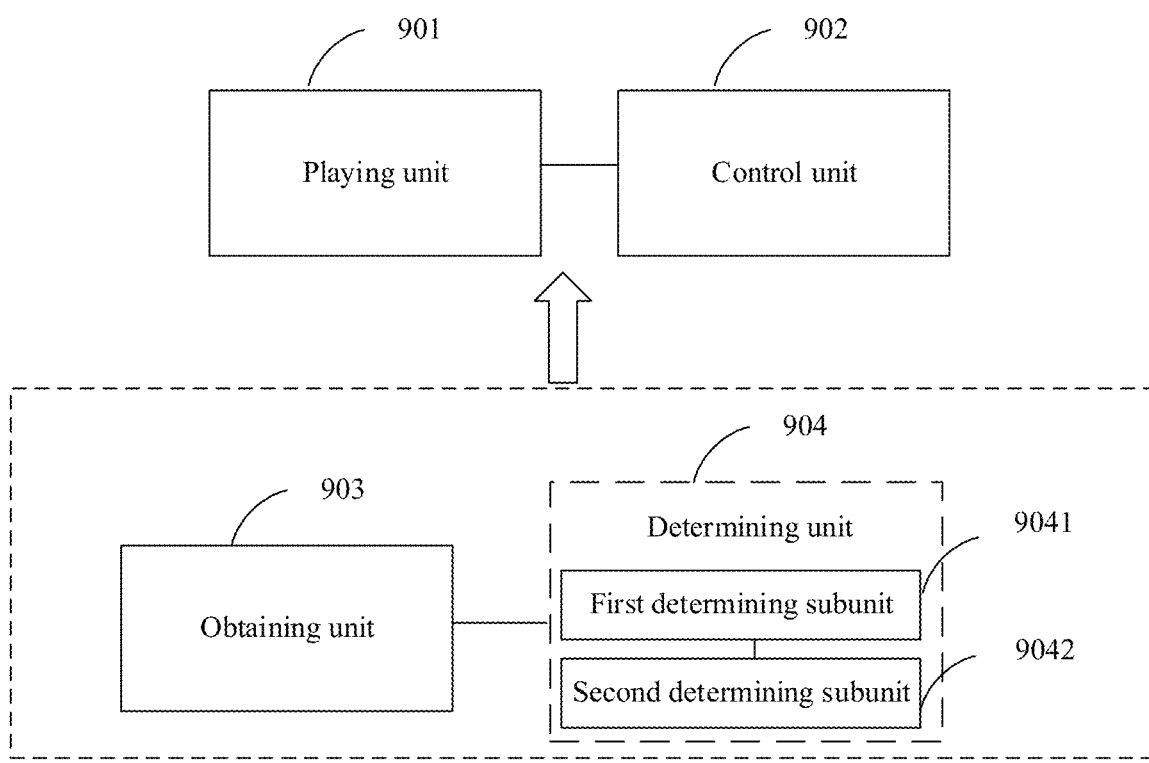
FIG. 9F is another schematic structural diagram of the video playing apparatus according to an embodiment of the present disclosure.

In some embodiments of the present disclosure, referring to FIG. 9F, the content attractiveness representation information includes audio information about the target video; and the determining unit 904 may include a first determining subunit 9041 and a second determining subunit 9042 as follows:

The first determining subunit 9041 is configured to determine an audio tempo change feature of the target video within a time period between a playing starting point and a playing ending point of the target video based on the audio information.

The second determining subunit 9042 is configured to determine a starting position and an ending position of the bullet comment adjustment video segment in the target video based on the audio tempo change feature.

Figure 9G:
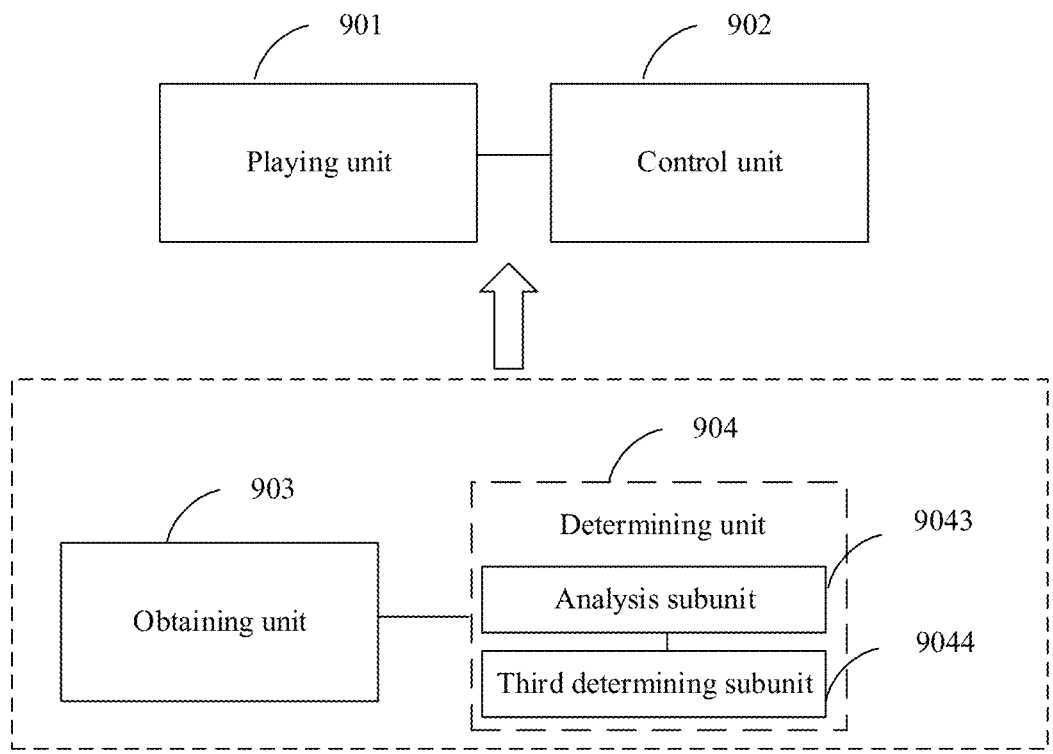
FIG. 9G is another schematic structural diagram of the video playing apparatus according to an embodiment of the present disclosure.

In some embodiments of the present disclosure, referring to FIG. 9G, the content attractiveness representation information includes user interaction information about the target video; and the determining unit 904 may include an analysis subunit 9043 and a third determining subunit 9044 as follows:

The analysis subunit 9043 is configured to analyze the user interaction information to obtain a user attention degree of the target video.

The third determining subunit 9044 is configured to determine the bullet comment adjustment video segment in the target video based on the user attention degree.

In some embodiments of the present disclosure, the user interaction information includes bullet comment information; the analysis subunit 9043 may be specifically configured to divide the target video into at least one video segment; and calculate, based on bullet comment information corresponding to each video segment, a bullet comment density of the each video segment in the target video; and the third determining subunit 9044 may be specifically configured to determine a video segment whose bullet comment density is greater than a preset bullet comment density threshold in the target video as the bullet comment adjustment video segment of the target video.

In some embodiments of the present disclosure, the determining unit 904 may further include an analysis information setting subunit as follows:

The analysis information setting subunit is configured to display an analysis information setting page of the bullet comment adjustment video segment; determine video identification information about the target video, a video segment division parameter of the target video, and the corresponding preset bullet comment density threshold based on an analysis information setting operation performed by the user on the analysis information setting page; obtain the video information about the target video based on the video identification information; and divide the target video into at least one video segment based on the video segment division parameter.

It may be learned from the above that in one embodiment, the playing unit 901 plays the target video. The control unit 902 controls a bullet comment display effect corresponding to the bullet comment adjustment video segment when the target video is played to the bullet comment adjustment video segment, to adjust a blocking degree of the bullet comments blocking the bullet comment adjustment video segment in a display region of the target video. In the present disclosure, in a bullet comment adjustment video segment of a video, a bullet comment display effect corresponding to the bullet comment adjustment video segment may be controlled to make the effect better meet user watching requirements.

Each module/unit and/or submodule/subunit in various disclosed embodiments can be integrated in a processing unit, or each module/unit and/or submodule/subunit can exist separately and physically, or two or more modules/units and/or submodule/subunit can be integrated in one unit. The modules/units and/or submodule/subunit as disclosed herein can be implemented in the form of hardware (e.g., processing circuitry and/or memory) or in the form of software functional unit(s) (e.g., developed using one or more computer programming languages), or a combination of hardware and software.

Figure 10:
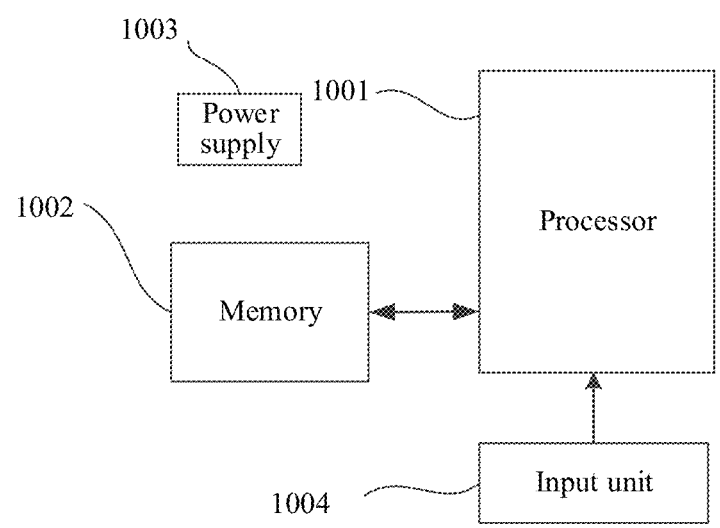
FIG. 10 is a schematic structural diagram of an electronic device according to an embodiment of the present disclosure.

One embodiment of the present disclosure further provides an electronic device. FIG. 10 is a schematic structural diagram of an electronic device according to an embodiment of the present disclosure.

Specifically, the electronic device may include components such as a processor 1001 with one or more processing cores, a memory 1002 with one or more computer-readable storage media, a power supply 1003, and an input unit 1004. A person skilled in the art may understand that the electronic device structure shown in FIG. 10 does not constitute a limitation to the electronic device. The electronic device may include more or fewer component than those shown in the figure, may combine some component, or may have different component arrangements.

The processor 1001 is a control center of the electronic device, and connects various parts of the entire electronic device by using various interfaces and lines. By running or executing a software program and/or a module stored in the memory 1002, and invoking data stored in the memory 1002, the processor performs various functions of the electronic device and processes data, thereby performing overall monitoring on the electronic device. In some embodiments, the processor 1001 may include one or more processing cores. The processor 1001 may integrate an application processor and a modem processor. The application processor mainly processes an operating system, a UI, an application program, and the like. The modem processor mainly processes wireless communication. It may be understood that the foregoing modem may alternatively not be integrated into the processor 1001.

The memory 1002 may be configured to store a software program and a module, and the processor 1001 runs the software program and the module that are stored in the memory 1002, to implement various functional application and data processing. The memory 1002 may mainly include a program storage area and a data storage area. The program storage area may store an operating system, an application program required by at least one function (such as a sound playing function and an image display function), and the like. The data storage area may store data created according to use of the electronic device, and the like. In addition, the memory 1002 may include a high speed random access memory, and may alternatively include a non-volatile memory, such as at least one magnetic disk storage device, a flash memory, or another volatile solid-state storage device. Correspondingly, the memory 1002 may further include a memory controller, so that the processor 1001 may access the memory 1002.

The electronic device further includes the power supply 1003 for supplying power to the components. The power supply 1003 may logically connect to the processor 1001 by using a power supply management system, thereby implementing functions, such as charging, discharging, and power consumption management, by using the power supply management system. The power supply 1003 may further include one or more of a direct current or alternating current power supply, a re-charging system, a power failure detection circuit, a power supply converter or inverter, a power supply state indicator, and any other components.

The electronic device may further include the input unit 1004. The input unit 1004 may be configured to receive entered numeric or character information and generate keyboard, mouse, joystick, optical, or trackball signal input related to user settings and function control.

Although not shown in the figure, the electronic device may further include a display unit, and the like. Details are not described herein again. Specifically, in one embodiment, the processor 1001 of the electronic device may load, according to the following instructions, executable files corresponding to processes of one or more application programs into the memory 1002. The processor 1001 runs the application programs stored in the memory 1002, to implement the various functions as follows:

A target video is played, and according to a playing progress of the target video, and starting position information and ending position information about a bullet comment adjustment video segment in the target video, a bullet comment display effect corresponding to the bullet comment adjustment video segment is controlled when the target video is played to the bullet comment adjustment video segment, to adjust a blocking degree of the bullet comments blocking the bullet comment adjustment video segment in a display region of the target video. For specific implementations of the foregoing operations, refer to the foregoing embodiments. Details are not described herein again.

It may be learned from the above that in one embodiment, the target video is played. A bullet comment display effect corresponding to the bullet comment adjustment video segment is controlled when the target video is played to the bullet comment adjustment video segment, to adjust a blocking degree of the bullet comments blocking the bullet comment adjustment video segment in a display region of the target video. In the present disclosure, in a bullet comment adjustment video segment of a video, a bullet comment display effect corresponding to the bullet comment adjustment video segment may be controlled to make the effect better meet user watching requirements.

A person of ordinary skill in the art may understand that, all or some steps of the methods of the foregoing embodiments may be implemented through instructions, or implemented through instructions controlling relevant hardware, and the instructions may be stored in a computer-readable storage medium and loaded and executed by a processor.

Accordingly, an embodiment of the present disclosure provides a storage medium, storing a plurality of instructions, the instructions being processor-loadable, to perform the steps in any video playing method according to the embodiments of the present disclosure. For example, the instructions may perform the following steps:

playing a target video, and controlling, according to a playing progress of the target video, and starting position information and ending position information about a bullet comment adjustment video segment in the target video, a bullet comment display effect corresponding to the bullet comment adjustment video segment when the target video is played to the bullet comment adjustment video segment, to adjust a blocking degree of the bullet comments blocking the bullet comment adjustment video segment in a display region of the target video.

For specific implementations of the foregoing operations, refer to the foregoing embodiments. Details are not described herein again.

The storage medium may include: a read-only memory (ROM), a random access memory (RAM), a magnetic disk, an optical disc or the like.

Because the instructions stored in the storage medium may perform the steps of any video playing method in the embodiments of the present disclosure, the instructions can achieve beneficial effects that may be achieved by any video playing method in the embodiments of the present disclosure. For details, refer to the foregoing embodiments. Details are not described herein again.

The system related to the embodiments of the present disclosure may be a distributed system formed by connecting a client to a plurality of nodes (electronic devices in any form in an access network, such as, servers and terminals) in a network communication form.

Figure 11:
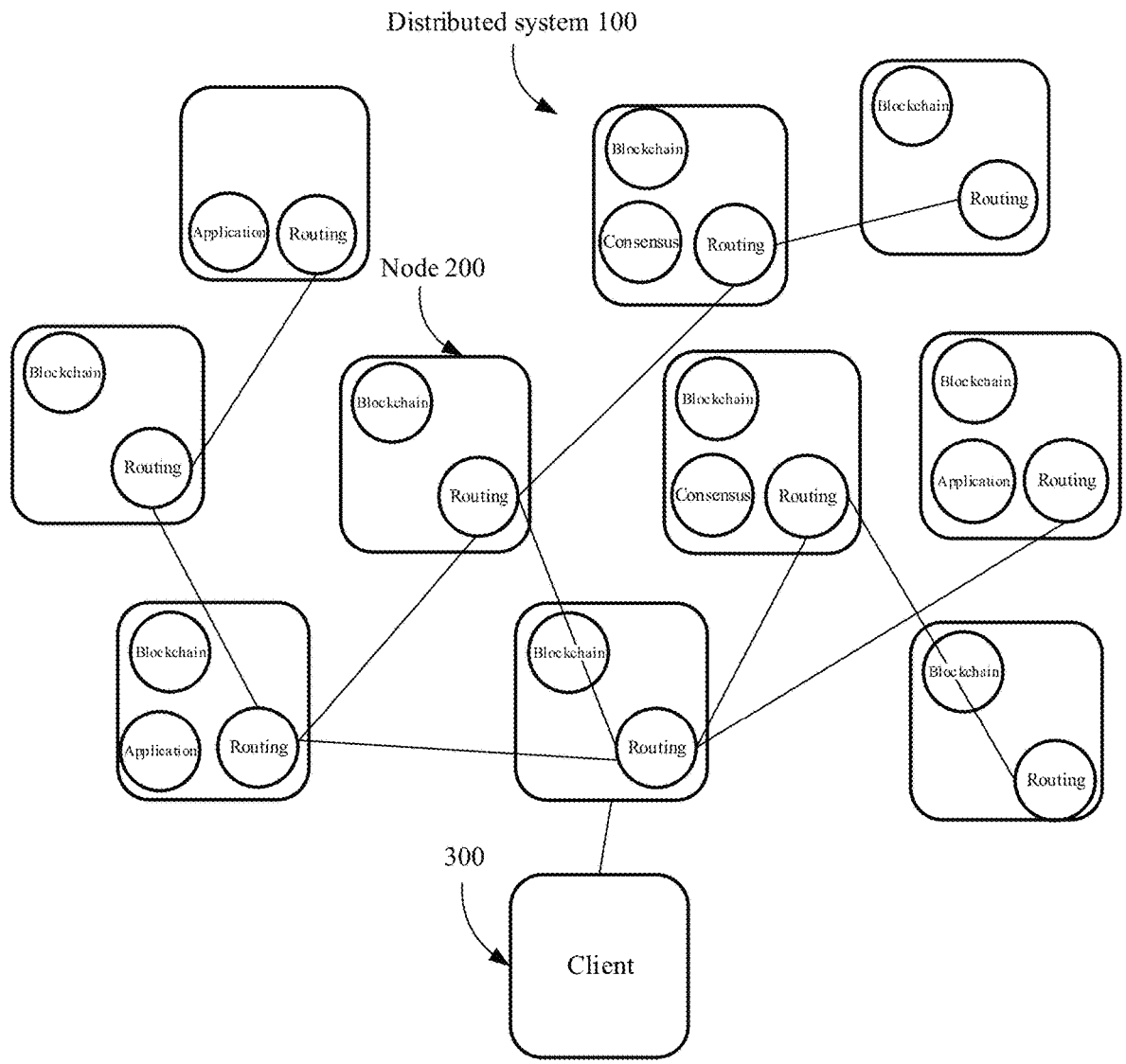
FIG. 11 is a schematic structural diagram of a distributed system 100 applied to a blockchain system according to an embodiment of the present disclosure.

For example, the distributed system is a blockchain system. Referring to FIG. 11, FIG. 11 is a schematic structural diagram of a distributed system 100 applied to a blockchain system according to an embodiment of the present disclosure. The distributed system is formed of a plurality of nodes 200 (computing devices in any form in an access network, such as, servers and user terminals) and a client 300. A peer-to-peer (P2P) network is formed between the nodes 200. The P2P protocol is an application-layer protocol running over the Transmission Control Protocol (TCP). Any machine such as a server or a terminal may be added to the distributed system to become a node. The nodes include a hardware layer, an intermediate layer, an operating system layer, and an application layer. In one embodiment, the information such as the video content of the target video and the user interaction information about the target video may be stored in a shared ledger of a blockchain system by nodes. An electronic device (for example, a terminal or a server) may obtain the information such as the video content of the target video and the user interaction information (e.g., bullet comments) about the target video based on recorded data stored in the shared ledger.

Referring to functions of each node in the blockchain system shown in FIG. 11, the related functions include the following:

(1) Routing: which is a basic function of a node, and is used for supporting communication between nodes.

In addition to the routing function, the node may further have the following functions:

(2) Application: which is deployed in a blockchain, and is used for implementing a particular service according to an actual service requirement, recording data related to function implementation to form recorded data, adding a digital signature to the recorded data to indicate a source of task data, and transmitting the recorded data to another node in the blockchain system, so that the another node adds the recorded data to a temporary block when successfully verifying a source and integrity of the recorded data.

For example, services implemented by the application include:

(2.1) Wallet: used for providing a transaction function with electronic money, including transaction initiation (that is, a transaction record of a current transaction is transmitted to another node in the blockchain system, and the another node stores, after successfully verifying the transaction record, recorded data of the transaction to a temporary block in a blockchain in response to admitting that the transaction is valid). Certainly, the wallet further supports querying for remaining electronic money in an electronic money address;

(2.2) Shared ledger: used for providing functions of operations such as storage, query, and modification of account data. Recorded data of the operations on the account data is transmitted to another node in the blockchain system. The another node stores, after verifying that the account data is valid, the recorded data to a temporary block in response to admitting that the account data is valid, and may further transmit an acknowledgment to a node initiating the operations.

(2.3) Smart contract: which is a computerized protocol, may be used for executing conditions of a contract, and is implemented by using code that is deployed in the shared ledger and that is executed when a condition is satisfied. The code is used for completing, according to an actual service requirement, an automated transaction, for example, searching for a delivery status of goods purchased by a purchaser, and transferring electronic money of the purchaser to an address of a merchant after the purchaser signs for the goods. Certainly, the smart contract is not limited only to a contract used for executing a transaction, and may be further a contract used for processing received information.

(3) Blockchain: including a series of blocks that are consecutive in a chronological order of generation. Once a new block is added to the blockchain, the new block is no longer removed. The block records recorded data submitted by the node in the blockchain system.

Figure 12:
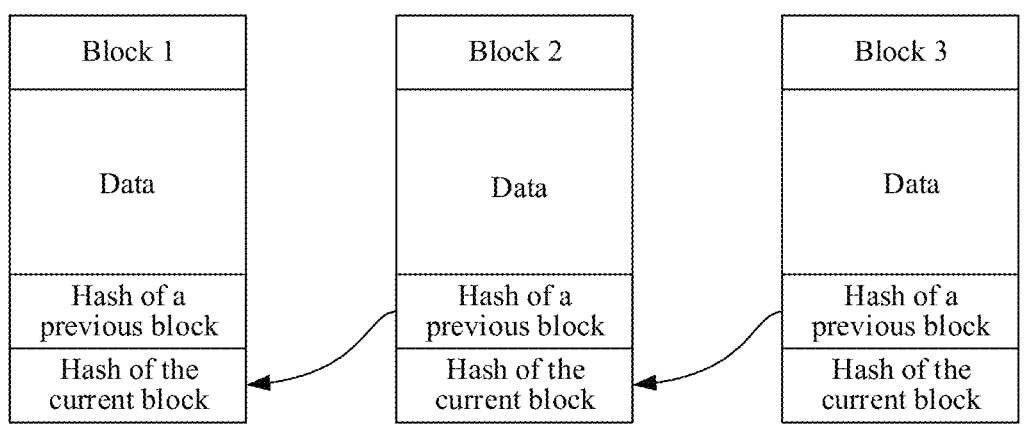
FIG. 12 is a schematic diagram of a block structure according to an embodiment of the present disclosure.

Referring to FIG. 12, FIG. 12 is a schematic diagram of a block structure according to an embodiment of the present disclosure. Each block includes a hash value of a transaction record stored in the current block (a hash value of the current block) and a hash value of a previous block. Blocks are connected according to hash values to form a blockchain. In addition, the block may further include information such as a timestamp indicating a block generation time. A blockchain is a decentralized database essentially, and is a series of associated data blocks generated by using a cryptographic method. Each data block includes related information, and is configured to verify the validity (anti-counterfeiting) of the information of the data block, and generate a next block.

A video playing method and apparatus, an electronic device, and a storage medium provided in the embodiments of the present disclosure are described in detail above. The principle and implementations of the present disclosure are described herein by using specific examples. The descriptions of the foregoing embodiments are merely used for helping understand the method and core ideas of the present disclosure. In addition, a person skilled in the art can make changes to the present disclosure in terms of the specific implementations and application scopes according to the ideas of the present disclosure. Therefore, the content of this specification shall not be construed as a limitation on the present disclosure.

What is claimed is:

1. A video playing method, performed by a terminal device, the method comprising:
   playing a target video;
   dividing the target video into one or more video segments with an analysis duration;
   obtaining video information about the target video, the video information including content attractiveness representation information about the target video associated with a bullet comment density, the content attractiveness representation information indicating attractiveness of content of the target video for a plurality of viewers, and the plurality of viewers including different viewers that have viewed the target video and/or produced bullet comments on the target video;
   calculating the bullet comment density by dividing a total bullet comment quantity within a video segment by the analysis duration, bullet comments being comments entered by the plurality of viewers and displayed on a screen together with the target video;
   determining, based on the video information, a bullet comment adjustment video segment based on the bullet comment density of the content attractiveness representation information; and
   controlling, according to a playing progress of the target video and starting position information and ending position information about the bullet comment adjustment video segment in the target video, a bullet comment display effect corresponding to the bullet comment adjustment video segment, to adjust a blocking degree of bullet comments blocking the bullet comment adjustment video segment in a display region of the target video when the target video is played to the bullet comment adjustment video segment.

2. The method according to claim 1, wherein the video information comprises the starting position information and the ending position information about the bullet comment adjustment video segment in the target video, and the determining, based on the video information, the bullet comment adjustment video segment comprises:
   determining a starting position and an ending position, in the target video, of the bullet comment adjustment video segment based on the starting position information and the ending position information; and
   determining the bullet comment adjustment video segment in the target video according to the starting position and the ending position.

3. The method according to claim 1, wherein the content attractiveness representation information comprises audio information about the target video; and the determining the bullet comment adjustment video segment in the target video based on the content attractiveness representation information comprises:
   determining an audio tempo change feature of the target video within a time period between a playing starting point and a playing ending point of the target video based on the audio information; and
   determining a starting position and an ending position of the bullet comment adjustment video segment in the target video based on the audio tempo change feature.

4. The method according to claim 1, wherein the content attractiveness representation information comprises user interaction information about the target video; and the determining the bullet comment adjustment video segment in the target video based on the content attractiveness representation information comprises:
   analyzing the user interaction information to obtain a user attention degree of the target video; and
   determining the bullet comment adjustment video segment in the target video based on the user attention degree.

5. The method according to claim 4, wherein the user interaction information comprises bullet comment information; and
   the analyzing the user interaction information to obtain a user attention degree of the target video comprises:
      calculating, based on bullet comment information corresponding to each of the one or more segments, the bullet comment density of each of the one or more segments in the target video; and
   the determining the bullet comment adjustment video segment in the target video based on the user attention degree comprises:
      determining a video segment whose bullet comment density is greater than a preset bullet comment density threshold in the target video as the bullet comment adjustment video segment of the target video.

6. The method according to claim 5, wherein before the extracting the content attractiveness representation information about the target video from the video information, the method further comprises:
   displaying an analysis information setting page of the bullet comment adjustment video segment;
   determining video identification information about the target video, a video segment division parameter of the target video, and the corresponding preset bullet comment density threshold based on an analysis information setting operation performed by the user on the analysis information setting page;
   the obtaining video information about the target video comprises:
      obtaining the video information about the target video based on the video identification information; and
   the dividing the target video into at least one video segment comprises:
      dividing the target video into the at least one video segment based on the video segment division parameter.

7. The method according to claim 5, wherein the user interactions include at least one of user bullet comments produced for the video segment or user likes placed on one or more bullet comments in the video segment.

8. The method according to claim 1, wherein the controlling a bullet comment display effect corresponding to the bullet comment adjustment video segment comprises:
   controlling, by adjusting a bullet comment display parameter corresponding to the bullet comment adjustment video segment, the bullet comment display effect when the target video is played to the bullet comment adjustment video segment.

9. The method according to claim 8, wherein the controlling, by adjusting a bullet comment display parameter corresponding to the bullet comment adjustment video segment, the bullet comment display effect when the target video is played to the bullet comment adjustment video segment comprises:
   obtaining a preset bullet comment display parameter corresponding to the bullet comment adjustment video segment; and
   adjusting the bullet comment display parameter corresponding to the bullet comment adjustment video segment to the preset bullet comment display parameter when the target video is played to the bullet comment adjustment video segment, to control the bullet comment display effect.

10. The method according to claim 1, wherein after the controlling a bullet comment display effect corresponding to the bullet comment adjustment video segment, the method further comprises:
restoring, upon completing playing the bullet comment adjustment video segment, the bullet comment display effect to a bullet comment display effect before the bullet comment adjustment video segment is displayed.

11. The method according to claim 1, wherein the controlling a bullet comment display effect corresponding to the bullet comment adjustment video segment comprises:
displaying a bullet comment display parameter setting page on a playing page of the target video when the target video is played to the bullet comment adjustment video segment; and
obtaining, based on a bullet comment display parameter setting operation performed by a user on the bullet comment display parameter setting page, a target bullet comment display parameter set by the user; and adjusting a bullet comment display parameter of the bullet comment adjustment video segment to the target bullet comment display parameter.

12. The method according to claim 1, further comprising:
in response to a smart bullet adjustment mode being turned off, controlling displaying and hiding of the bullet comments by turning on and off a bullet comment mode; and
in response to the smart bullet adjustment mode being turned on, disabling turning on and off the bullet comment mode, and according to bullet comment adjustment video segment information about the target video, determining whether current time of playing the target video enters a time period of the bullet comment adjustment video segment, wherein:
in response to the current time of playing the target video entering the time period of the bullet comment adjustment video segment, the bullet comment display parameter is adjusted to adjust a blocking degree of the bullet comments blocking the bullet comment adjustment video segment in a display region of the target video; and
in response to the bullet comment adjustment video segment being completed, restoring a bullet comment display parameter to a bullet comment display parameter before the bullet comment adjustment video segment is played.

13. An electronic device, comprising at least one memory and at least one processor, the at least one memory storing an application program, the at least one processor being configured to run the application program in the at least one memory to perform:
playing a target video;
dividing the target video into one or more video segments with an analysis duration;
obtaining video information about the target video, the video information including content attractiveness representation information about the target video associated with a bullet comment density, the content attractiveness representation information indicating attractiveness of content of the target video for a plurality of viewers, and the plurality of viewers including different viewers that have viewed the target video and/or produced bullet comments on the target video;
calculating the bullet comment density by dividing a total bullet comment quantity within a video segment by the analysis duration, bullet comments being comments entered by the plurality of viewers and displayed on a screen together with the target video;
determining, based on the video information, a bullet comment adjustment video segment based on the bullet comment density of the content attractiveness representation information; and
controlling, according to a playing progress of the target video and starting position information and ending position information about the bullet comment adjustment video segment in the target video, a bullet comment display effect corresponding to the bullet comment adjustment video segment, to adjust a blocking degree of bullet comments blocking the bullet comment adjustment video segment in a display region of the target video when the target video is played to the bullet comment adjustment video segment.

14. The device according to claim 13, wherein the content attractiveness representation information comprises user interaction information about the target video; and the determining the bullet comment adjustment video segment in the target video based on the content attractiveness representation information comprises:
analyzing the user interaction information to obtain a user attention degree of the target video; and
determining the bullet comment adjustment video segment in the target video based on the user attention degree.

15. The device according to claim 14, wherein the user interaction information comprises bullet comment information; and the analyzing the user interaction information to obtain a user attention degree of the target video comprises:
calculating, based on bullet comment information corresponding to each of the one or more video segments, the bullet comment density of each of the one or more video segments in the target video; and
the determining the bullet comment adjustment video segment in the target video based on the user attention degree comprises:
determining a video segment whose bullet comment density is greater than a preset bullet comment density threshold in the target video as the bullet comment adjustment video segment of the target video.

16. The device according to claim 13, wherein the controlling a bullet comment display effect corresponding to the bullet comment adjustment video segment comprises:
obtaining a preset bullet comment display parameter corresponding to the bullet comment adjustment video segment; and
adjusting the bullet comment display parameter corresponding to the bullet comment adjustment video segment to the preset bullet comment display parameter when the target video is played to the bullet comment adjustment video segment, to control the bullet comment display effect.

17. The device according to claim 13, wherein after the controlling a bullet comment display effect corresponding to the bullet comment adjustment video segment, the method further comprises:
restoring, upon completing playing the bullet comment adjustment video segment, the bullet comment display effect to a bullet comment display effect before the bullet comment adjustment video segment is displayed.

18. A non-transitory storage medium, storing a plurality of instructions, the instructions being configured to be loaded by a processor, to perform:

playing a target video;

dividing the target video into one or more video segments with an analysis duration;

obtaining video information about the target video, the video information including content attractiveness representation information about the target video associated with a bullet comment density, the content attractiveness representation information indicating attractiveness of content of the target video for a plurality of viewers, and the plurality of viewers including different viewers that have viewed the target video and/or produced bullet comments on the target video;

calculating the bullet comment density by dividing a total bullet comment quantity within a video segment by the analysis duration, bullet comments being comments entered by the plurality of viewers and displayed on a screen together with the target video;

determining, based on the video information, a bullet comment adjustment video segment based on the bullet comment density of the content attractiveness representation information; and controlling, according to a playing progress of the target video and starting position information and ending position information about the bullet comment adjustment video segment in the target video, a bullet comment display effect corresponding to the bullet comment adjustment video segment, to adjust a blocking degree of bullet comments blocking the bullet comment adjustment video segment in a display region of the target video when the target video is played to the bullet comment adjustment video segment.

* * * * *